United States Patent
Gao et al.

(10) Patent No.: US 9,113,431 B2
(45) Date of Patent: Aug. 18, 2015

(54) METHOD FOR CORROBORATION AND TRANSFERRING TRUST BETWEEN NETWORK DATABASES FOR ENHANCED POSITIONING ACCURACY

(71) Applicant: QUALCOMM Incorporated, San Diego, CA (US)

(72) Inventors: Weihua Gao, San Jose, CA (US); Benjamin A. Werner, San Carlos, CA (US); Moi Riba, Santa Clara, CA (US); Bruce E. Wilson, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/796,713

(22) Filed: Mar. 12, 2013

(65) Prior Publication Data

US 2014/0140227 A1    May 22, 2014

Related U.S. Application Data

(60) Provisional application No. 61/727,243, filed on Nov. 16, 2012.

(51) Int. Cl.
*H04L 1/00* (2006.01)
*H04W 64/00* (2009.01)
*G01S 5/02* (2010.01)

(52) U.S. Cl.
CPC ............... *H04W 64/00* (2013.01); *G01S 5/021* (2013.01); *G01S 5/0263* (2013.01); *G01S 5/0236* (2013.01)

(58) Field of Classification Search
CPC .................................................. G01S 5/0263
See application file for complete search history.

(56) References Cited

U.S. PATENT DOCUMENTS

| | | | |
|---|---|---|---|
| 8,155,666 B2 | 4/2012 | Alizadeh-Shabdiz | |
| 2003/0217151 A1 | 11/2003 | Roese et al. | |
| 2006/0019679 A1 | 1/2006 | Rappaport et al. | |
| 2009/0181695 A1 | 7/2009 | Wirola et al. | |
| 2011/0021207 A1 | 1/2011 | Morgan et al. | |
| 2011/0103360 A1 | 5/2011 | Ku et al. | |
| 2011/0183626 A1* | 7/2011 | Das et al. | 455/67.11 |
| 2011/0250903 A1* | 10/2011 | Huang et al. | 455/456.1 |
| 2013/0143599 A1* | 6/2013 | Li et al. | 455/456.2 |

OTHER PUBLICATIONS

International Search Report and Written Opinion—PCT/US2013/069226—ISA/EPO—Jun. 27, 2014, 17 pgs.
International Preliminary Report on Patentability—PCT/US2013/069226—The International Bureau of WIPO Geneva, Switzerland, Jan. 27, 2015, 22 pgs.
Taiwan Search Report—TW102141816—TIPO—issued in related case on Mar. 9, 2015, 1 page.

* cited by examiner

*Primary Examiner* — Jason Mattis
*Assistant Examiner* — Kevin Cunningham
(74) *Attorney, Agent, or Firm* — Hunter Clark PLLC

(57) ABSTRACT

Techniques for transferring trust between networks are described herein. An example of a method of using a mobile device to transfer trust between networks described herein includes receiving WAN base station information including a WAN base station trustworthiness value, determining a WAN position estimate for the mobile device based on the WAN base station information, receiving access point information including an access point trustworthiness value, determining an access point position estimate for the mobile device based on the access point information, determining if the WAN position estimate and the access point position estimate are corroborated, and increasing the access point trustworthiness value if the WAN position estimate and the access point position estimate are corroborated and the WAN base station trustworthiness value is higher than the access point trustworthiness value.

25 Claims, 12 Drawing Sheets

METHOD FOR CORROBORATION AND TRANSFERRING TRUST BETWEEN NETWORK DATABASES FOR ENHANCED POSITIONING ACCURACY

CROSS-REFERENCE TO RELATED ACTIONS

This application claims the benefit of U.S. Provisional Application No. 61/727,243, entitled "METHOD FOR CORROBORATION AND TRANSFERRING TRUST BETWEEN WIFI AND CELL NETWORK DATABASES FOR ENHANCED POSITIONING ACCURACY," filed on Nov. 16, 2012, which is assigned to the assignee hereof, and expressly incorporated herein by reference.

BACKGROUND

1. Field

This disclosure relates in general to radio location systems and, more specifically, but not by way of limitation, to transferring location related trust information between Access Point and Wide Area Networks.

2. Information

There is an ever growing desire to know the geographic position of various mobile devices. For example, some cellular phone operators may need to comply with requirements to locate handsets for emergency purposes. Once position is known, emergency personnel can be dispatched to aid resolving the emergency. Knowing geographic location serves many other purposes such as location-based advertising, child supervision, automated parolee supervision, reverse 911, fleet vehicle tracking, etc.

Currently, there are many ways to estimate a position of a mobile device on a network. For example, Global Navigation Satellite System (GNSS) solutions on a mobile device may provide position estimates that are most accurate when the mobile device is located in outdoor and open space environments. In another example, Wide Area Networks (WAN) base stations and Access Point (AP) networks (e.g., using WiFi, CDMA, WCDMA, LTE or other WAN Femtocells, or Bluetooth) can be used to estimate the position of a mobile device.

In general, AP based positioning is dependent on the integrity of information stored in an Almanac. In an embodiment, an almanac can be a database including a Service Set Identification (SSID), Media Access Control (MAC), or other appropriate address identifier, and position information associated with a wireless access point. The term access point can be a short range wire transceiver including WiFi access pints, Bluetooth transceivers, femtocells, and other short range wireless transceivers. The integrity of an almanac can be degraded due to the ease with which an owner of a wireless access point can move the hardware between locations without registering a new location for the AP. The integrity of the almanac may also be diminished by incorrect signal measurement, corrupt data, and other system failures.

In some areas of the world a stable AP almanac can be established, but the integrity of the location information in a WAN almanac may be lacking. In this case, access point generated position estimates can be used to verify the WAN base station positions.

SUMMARY

An example of a method of using a mobile device to transfer trust between networks according to the disclosure includes receiving WAN base station information including a WAN base station trustworthiness value, determining a WAN position estimate for the mobile device based on the WAN base station information, receiving access point information including an access point trustworthiness value, determining an access point position estimate for the mobile device based on the access point information, determining if the WAN position estimate and the access point position estimate are corroborated, and increasing the access point trustworthiness value if the WAN position estimate and the access point position estimate are corroborated and the WAN base station trustworthiness value is higher than the access point trustworthiness value.

Implementations of the method may include one or more of the following features. Increasing the WAN base station trustworthiness value if the WAN position estimate and the access point position estimate are corroborated and the access point trustworthiness value is higher than the WAN base station trustworthiness value. Determining a combined position estimate based on the WAN base station information and the access point information, and outputting the combined position estimate. Disregarding the access point position estimate if the WAN position estimate and the access point position estimate are uncorroborated and the WAN base station trustworthiness value is higher than the access point trustworthiness value, outputting the WAN position estimate and decreasing the access point trustworthiness value. Disregarding the WAN position estimate if the WAN position estimate and the access point position estimate are uncorroborated and the WAN base station trustworthiness value is lower than the access point trustworthiness value, outputting the access point position estimate and decreasing the WAN base station trustworthiness value.

An example of a system for transferring trust between network base stations according to the disclosure a base station database operative to maintain a database identifying one or more WAN base stations and corresponding WAN location information, and one or more access points and corresponding access point location information, such that the WAN location information includes a WAN trustworthiness value for each of the WAN base stations, and the access point local information includes an access point trustworthiness value for each of the access points, a position determination module configured to determine a WAN position estimate for a mobile device based on the WAN location information corresponding to a WAN base station that is in communication with the mobile device, determine an access point position estimate for the mobile device based on the access point location information corresponding to an access point that is in communication with the mobile device, an almanac processor configured to compare the WAN trustworthiness value associated with the WAN base station and the access point trustworthiness value associated with the access point, determine if the WAN position estimate and the access point position estimate are corroborated, increase the access point trustworthiness value if the WAN position estimate and the access point position estimate are corroborated and the WAN trustworthiness value higher than the access point trustworthiness value, and increase the WAN trustworthiness value if the WAN position estimate and the access point position estimate are corroborated and the WAN trustworthiness value is lower than the access point trustworthiness value.

An example of an apparatus for transferring trust between networks according to the disclosure includes means for receiving WAN base station information including a WAN base station trustworthiness value, means for determining a WAN position estimate for the mobile device based on the WAN base station information, means for receiving access point information including an access point trustworthiness value, means for determining an access point position estimate for the mobile device based on the access point information, means for determining if the WAN position estimate and the access point position estimate are corroborated, and means for increasing the access point trustworthiness value if the WAN position estimate and the access point position estimate are corroborated and the WAN base station trustworthiness value is higher than the access point trustworthiness value.

An example of a computer program product residing on a processor-executable computer storage medium according to the disclosure includes processor-executable instructions configured to cause a processor to receive WAN base station information including a WAN base station trustworthiness value, determine a WAN position estimate for the mobile device based on the WAN base station information, receive access point information including an access point trustworthiness value, determine an access point position estimate for the mobile device based on the access point information, determine if the WAN position estimate and the access point position estimate are corroborated, and increase the access point trustworthiness value if the WAN position estimate and the access point position estimate are corroborated and the WAN base station trustworthiness value is higher than the access point trustworthiness value.

An example of a method of using a mobile device to transfer trust between networks according to the disclosure includes receiving network station information from a plurality of base stations, determining a first position estimate for a mobile device based on the network station information, receiving network station information from a single base station, such that the single base station is not one of the plurality of base stations, determining a location of the single base station, determining if the first position estimate for the mobile device and the location of the single base station are corroborated, and increasing a trustworthiness value associated with the single base station if the first position estimate for the mobile device and the location of the single base station are corroborated.

An example of an apparatus for transfer trust between networks according to the disclosure includes a memory, a processor configured to receive network station information from a plurality of base stations, determine a first position estimate for a mobile device based on the network station information, receive network station information from a single base station, such that the single base station is not one of the plurality of base stations, determine a location of the single base station, determine if the first position estimate for the mobile device and the location of the single base station are corroborated, and increase a trustworthiness value associated with the single base station if the first position estimate for the mobile device and the location of the single base station are corroborated, such that the trustworthiness value is stored in the memory.

An example of an apparatus for transferring trust between networks according to the disclosure includes means for receiving network station information from a plurality of base stations, means for determining a first position estimate for a mobile device based on the network station information, means for receiving network station information from a single base station, such that the single base station is not one of the plurality of base stations, means for determining a location of the single base station, means for determining if the first position estimate for the mobile device and the location of the single base station are corroborated, and means for increasing a trustworthiness value associated with the single base station if the first position estimate for the mobile device and the location of the single base station are corroborated.

An example of computer program product residing on a processor-executable storage medium according to the disclosure includes processor-executable instructions configured to cause a processor to receive network station information from a plurality of base stations, determine a first position estimate for a mobile device based on the network station information, receive network station information from a single base station, such that the single base station is not one of the plurality of base stations, determine a location of the single base station, determine if the first position estimate for the mobile device and the location of the single base station are corroborated, and increase a trustworthiness value associated with the single base station if the first position estimate for the mobile device and the location of the single base station are corroborated.

An example of a method of determining the position of a mobile device according to the disclosure includes receiving a first network station information from a first base station, including location information and trustworthiness information for the first base station, receiving a second network station information from a second base station, including location information and trustworthiness information for the second base station, determining if the location information for the first and second base stations corroborate with one another, determining a first position estimate for the mobile device based on the first and second network station information if the location information is corroborated, determining a second position estimate for the mobile device based on the first network station information if the location information is uncorroborated and the trustworthiness value of the first base station is higher than the trustworthiness of the second base station, and determining a third position estimate for the mobile device based on the second network station information if the location information is uncorroborated and the trustworthiness value of the second base station is higher than the trustworthiness of the first base station.

An example of an apparatus for determining the position of a mobile device according to the disclosure includes means for receiving a first network station information from a first base station, including location information and trustworthiness information for the first base station, means for receiving a second network station information from a second base station, including location information and trustworthiness information for the second base station, means for determining if the location information for the first and second base stations corroborate with one another, means for determining a first position estimate for the mobile device based on the first and second network station information if the location information is corroborated, means for determining a second position estimate for the mobile device based on the first network station information if the location information is uncorroborated and the trustworthiness value of the first base station is higher than the trustworthiness of the second base station, and means for determining a third position estimate for the mobile device based on the second network station information if the location information is uncorroborated and the trustworthiness value of the second base station is higher than the trustworthiness of the first base station.

An example of an apparatus for determining the position of a mobile device according to the disclosure includes a memory, a processor configured to receive a first network station information from a first base station, including location information and trustworthiness information for the first base station, receive a second network station information from a second base station, including location information and trustworthiness information for the second base station, determine if the location information for the first and second base stations corroborate with one another, determine a first position estimate for the mobile device based on the first and second network station information if the location information is corroborated, determine a second position estimate for the mobile device based on the first network station information if the location information is uncorroborated and the trustworthiness value of the first base station is higher than the trustworthiness of the second base station, determine a third position estimate for the mobile device based on the second network station information if the location information is uncorroborated and the trustworthiness value of the second base station is higher than the trustworthiness of the first base station, and store a mobile device position in the memory, such that the mobile device position is one of the first, second or third position estimates.

An example of a computer program product residing on a processor-executable computer storage medium according to the disclosure includes processor-executable instructions configured to cause a processor to receive a first network station information from a first base station, including location information and trustworthiness information for the first base station, receive a second network station information from a second base station, including location information and trustworthiness information for the second base station, determine if the location information for the first and second base stations corroborate with one another, determine a first position estimate for the mobile device based on the first and second network station information if the location information is corroborated, determine a second position estimate for the mobile device based on the first network station information if the location information is uncorroborated and the trustworthiness value of the first base station is higher than the trustworthiness of the second base station, determine a third position estimate for the mobile device based on the second network station information if the location information is uncorroborated and the trustworthiness value of the second base station is higher than the trustworthiness of the first base station, and store a mobile device position in the memory, such that the mobile device position is one of the first, second or third position estimates.

An example of a method of determining the position of a mobile device according to the disclosure includes receiving a request for network station information associated with one or more base stations, such that the network station information includes a trustworthiness value for each base station, comparing the trustworthiness value for each base station to a threshold value, utilizing the network station information for the one or more base stations that have a trustworthiness value equal to or greater than the threshold value to calculate a position for the mobile device, and outputting the position of the mobile device.

An example of an apparatus for determining the position of a mobile device according to the disclosure includes means for receiving a request for network station information associated with one or more base stations, such that the network station information includes a trustworthiness value for each base station, means for comparing the trustworthiness value for each base station to a threshold value, means for utilizing the network station information for the one or more base stations that have a trustworthiness value equal to or greater than the threshold value to calculate a position for the mobile device, and means for outputting the position of the mobile device.

An example of an apparatus for determining the position of a mobile device according to the disclosure includes a memory, a processor configured to receive a request for network station information associated with one or more base stations, such that the network station information is stored in the memory and includes a trustworthiness value for each base station, compare the trustworthiness value for each base station to a threshold value, utilize the network station information for the one or more base stations that have a trustworthiness value equal to or greater than the threshold value to calculate a position for the mobile device, and output the position of the mobile device.

An example of a computer program product residing on a processor-executable computer storage medium according to the disclosure includes processor-executable instructions configured to cause a processor to receive a request for network station information associated with one or more base stations, such that the network station information includes a trustworthiness value for each base station, compare the trustworthiness value for each base station to a threshold value, utilize the network station information for the one or more base stations that have a trustworthiness value equal to or greater than the threshold value to calculate a position for the mobile device, and output the position of the mobile device.

Items and/or techniques described herein may provide one or more of the following capabilities, as well as other capabilities no mentioned. A trustworthiness values can be assigned to WAN base stations and access points. The trustworthiness values associated with a WAN base station can be transferred to one or more access points. The trustworthiness values associated with an access point can be transferred to a WAN base station. Trustworthiness values may be used in determining the position of a mobile device. The position information associated with WAN base stations and access points with low trustworthiness values can be eliminated or down weighted in a position determination calculation. The accuracy of the position determination calculation can be improved. The techniques described herein can be implemented on both a network based server or within a handset using downloaded or discovered cellular data. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWING

The features, objects, and advantages of embodiments of the disclosure will become more apparent from the detailed description set forth below when taken in conjunction with the drawings, in which like elements bear like reference numerals. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
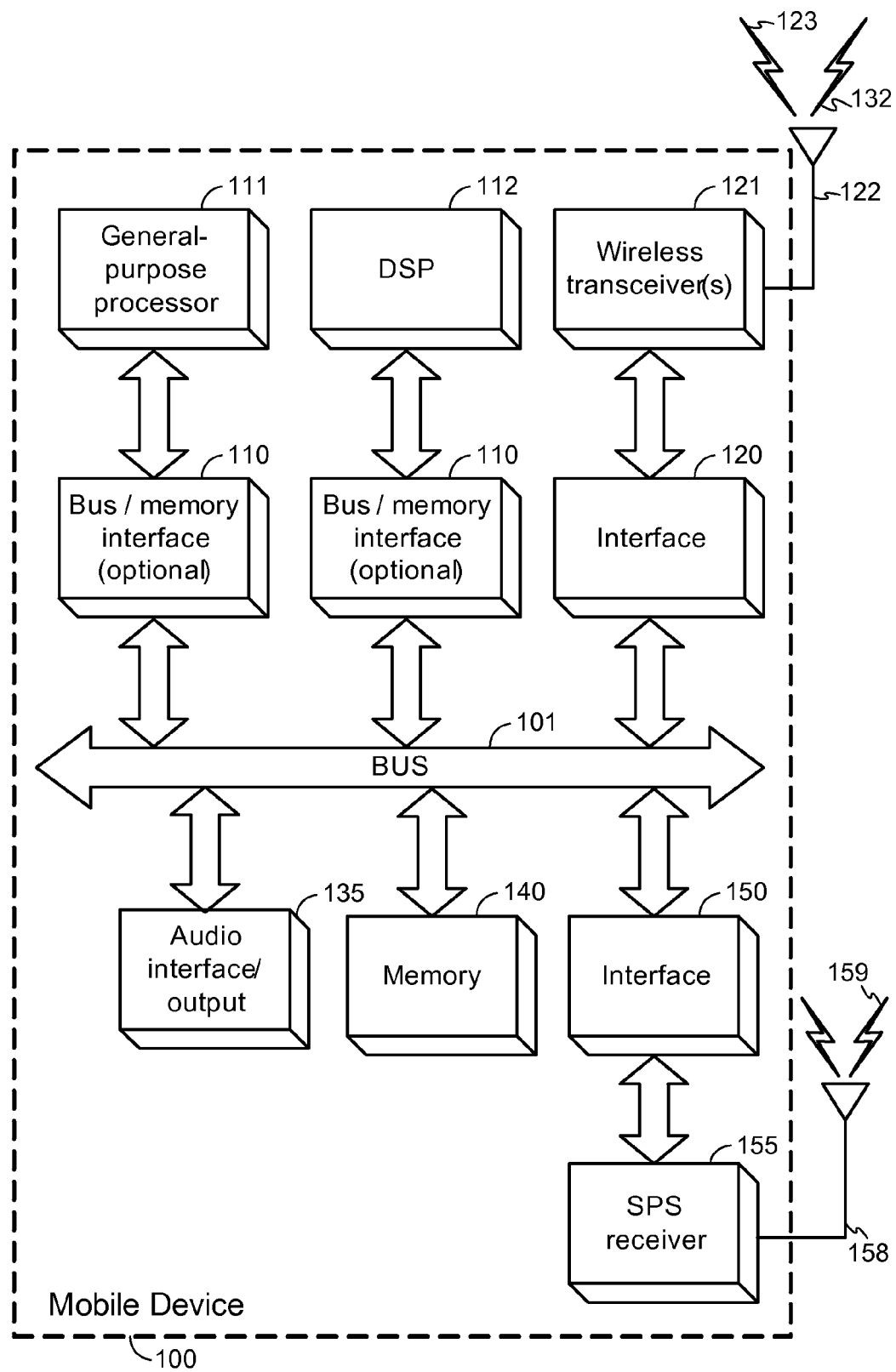
FIG. 1 is a schematic block diagram illustrating an exemplary mobile device capable of receiving access point and WAN base station signals, in accordance with an implementation.

A method and system are disclosed that allow for dynamically updating one or more almanacs associated with AP networks and wide area networks. A cellular network is an example of wide area network. In general, as mobile devices travel they can receive location information on various access points (i.e., short range wireless transceivers) and WAN base stations (e.g., cell phone towers, WAN access points). The location and identifying information associated with the various transceivers such as access points, femtocells and base stations may be contained in an almanac of transceivers. The received almanac information can be utilized along with received signals from transceivers in the almanac to determine a location of a mobile device. For example, an almanac or alamanacs, may store transceiver locations, identifying information, device type, frequency and/or other related information used to determine the position of a mobile device. MAC addresses, or other identifying information (e.g., SSIDs, Index Numbers) for access points may be included as part of almanac entries. A trustworthiness level which generally indicates the confidence with which the location information in an almanac can be used in the location calculations may also be included in an almanac. A trustworthiness level can be associated with difference sources of geographical location information (e.g., satellite, WAN, and AP fixes). When multiple location fixes can be obtained, the trustworthiness levels associated with the fixes can be determined. In general, if the calculated locations for each of the fixes do not correspond to one another, the position results with the lowest trustworthiness level can be discarded, and/or an alert can be generated. Alternatively, in some embodiments, information tied to particular transceivers may be discarded from or de-weighted in a location calculation if they add too much error and/or uncertainty to the calculated location.

In an example, the trustworthiness level of an access point that has moved, or has been recently added to a network, may be relatively low. The trustworthiness levels associated with the access points and the WAN base stations can be compared. Access points and base stations with low trustworthiness levels can be removed from the location calculations or de-weighted in calculations. The trustworthiness level of a an access point or WAN base station may be increased or decreased based on the results of the comparison of locations using information from a less trustworthy station versus the comparison of a location calculated using only more trustworthy stations. Similarly, a station may be deemed trustworthy if it does not significantly increase the estimated error associated with a location calculation and untrustworthy if it adds significantly to the estimated error associated with a location calculation, such as that determined by performing a least squares fit of the data. For example, if the position estimates from the different stations corroborate to one another, the trustworthiness level of one or all the stations can be increased.

Referring to FIG. 1, a mobile device 100 may contain one or more wireless transceiver(s) 121 which are capable of sending and receiving wireless signals over communication links 123, 132 via wireless antenna(s) 122 over a wireless network and connected to a bus 101 by a wireless transceiver network interface 120. The wireless transceiver bus interface 120 may, in some embodiments be a part of the wireless transceiver (s) 121. Some embodiments may have multiple wireless transceivers 121 and wireless antennas 122, for example, to support multiple wireless standards such as WAN standards such as CDMA, GSM, CDMA 2000, WCDMA, UMTS, and LTE and Wireless LAN and short range wireless standards such as WiFi, Bluetooth and Zigbee.

In certain embodiments of mobile device 100 may contain a Satellite Positioning System (SPS) receiver 155 capable of receiving Satellite Positioning System (SPS) signals 159 via SPS antenna 158. SPS receiver 155 may also process, in whole or in part, the Satellite Positioning System (SPS) signals 159 and use the SPS signals 159 to determine the location of the mobile device. In some embodiments, general-purpose processor(s) 111, memory 140, DSP(s) 112 and specialized processors (not shown) may also be utilized to process the SPS signals 159, in whole or in part, and/or calculate the location of the mobile device 100, in conjunction with SPS receiver 155. The storage of SPS or other location signals may be done in memory 140 or registers. An audio interface/output 135 can be included in mobile device 100 to convert signals to audible sound to enable transmission of the audible sound to the user.

The mobile device 100 may contain DSP(s) 112 connected to the bus 101 by a bus interface 110, general-purpose processor(s) 111 connected to the bus 101 by a bus interface 110 and memory 140, also sometimes connected to the bus by a bus interface 110. The bus interfaces 110 may be integrated with the DSP(s) 112, general-purpose processor(s) 111 and memory 140 with which they are associated. In various embodiments, functions may be stored as one or more instructions or code in memory 140 such as on a computer-readable storage medium, such as RAM, ROM, FLASH, or disc drive, and executed by general-purpose processor(s) 111, specialized processors, or DSP(s) 112. Memory 140 is a processor-readable memory and/or a computer-readable memory that stores software code (programming code, instructions, etc.) configured to cause the processor(s) 111 and/or DSP(s) 112 to perform functions described.

In other embodiments, functions may be performed in hardware.

Figure 2:
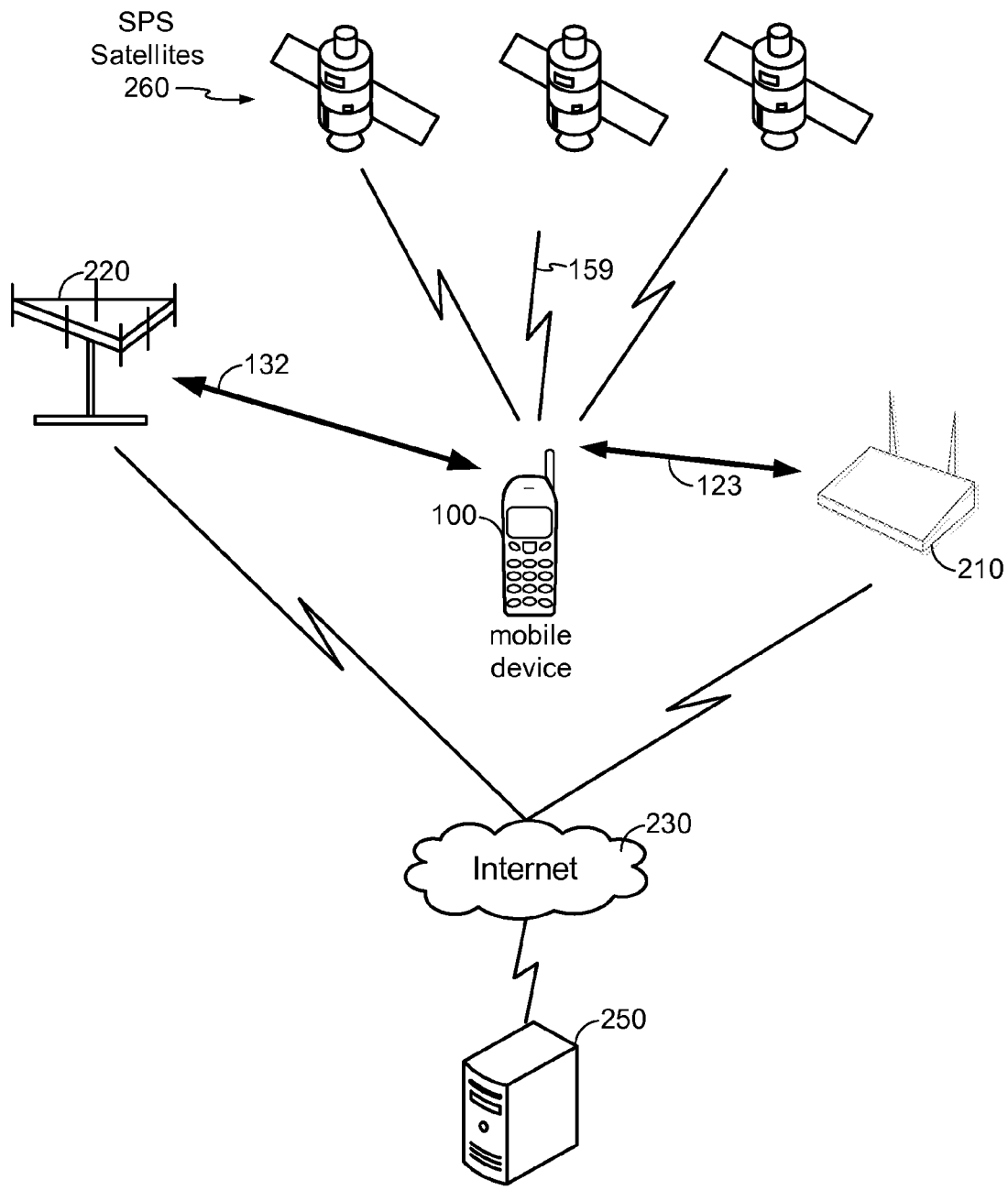
FIG. 2 is a system diagram illustrating certain features of a system containing a mobile device capable of receiving access point and WAN base station signals, in accordance with an implementation.

Referring to FIG. 2, a mobile device 100 may receive SPS signals 159 from SPS Satellites 260. In some embodiments, the SPS Satellites may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. The receiving and processing of SPS signals 159 is optional and not a limitation. In an embodiment, mobile devices without SPS capabilities may be used.

The mobile device 100 may query a location server 250 via an access point (i.e., short range wireless transceiver) 210, or a WAN base station 220, which may be connected via a network 230 such as the Internet. The configuration of the location server 250 is exemplary only, and not a limitation. In an embodiment, the location server may be connected directly to the WAN base station 220. More than one location server may be used. In other embodiments, a centralized location server may be used to support multiple wireless transceivers and base stations. The location server 250 includes one or more almanacs (i.e., databases) containing location information associated with base stations on a network. The location information may be associated with one or more access points 210, and/or one or more WAN base stations 220. In an example, the location server 250 is comprised of multiple server units such as a base station almanac and an access point almanac.

Figure 3:
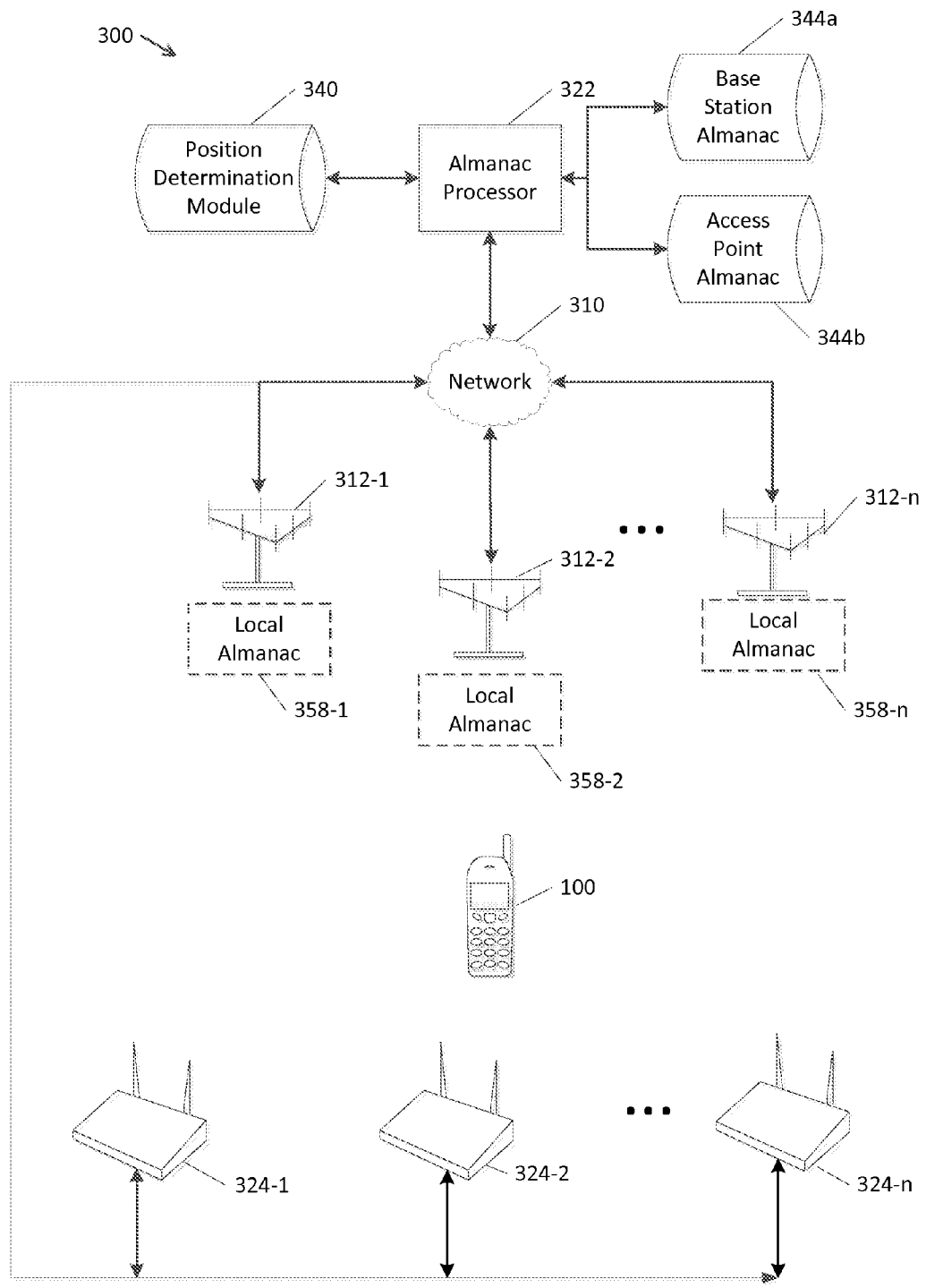
FIG. 3 is a block diagram of an embodiment of a system for corroborating and transferring trust between AP network and WAN base station almanacs.

Referring FIG. 3, a block diagram of an embodiment of system 300 for corroborating and transferring trust between AP and WAN databases is shown. The system 300 allows a mobile device 100 to find a geographic location by WAN base stations 312, and one or more access points 324. In an embodiment, the mobile device 100 can communicate with one or more WAN base stations 312 and access points 324 to provide location information. The WAN base stations 312 and access points 324 can be coupled to an almanac processor 322 via a network 310. In an embodiment, the network 310 can include the Internet. The almanac processor 322 can access a Position Determination Module (PDM) 340 and base station almanac 344a and/or access point almanac 344b to analyze and process the location information. The PDM 340 can determine and output position estimate based on the location information. Information in the base station almanac 344a and the access point almanac 344b can persist in a single database (e.g., location server 250), or in separate databases as shown in FIG. 3. Once analyzed and processed, the almanacs 344 (i.e., the base station almanac 344a and the access point almanac 344b) can be updated according to the trustworthiness values associated with the WAN base stations 312 and access points 324 respectively.

In an embodiment, the mobile device 100 can communicate with one or more WAN base stations 312 and access points 324 to provide location information. In an embodiment, the mobile device 100 is a cellular phone that may have any number of communication modes (e.g., GSM, CDMA, digital AM or FM radio, digital TV, TDMA, WCDMA, OFDM, GPRS, EV-DO, WiFi, Bluetooth, WiMAX, UWB, satellite phone or data, etc.) to transfer voice and/or data with cellular, satellite and/or mesh networks by way of the WAN base stations 312, and the and access point 324. In general, WAN base stations 312 and access points 324 can allow some sort of data or voice transport. The identifier in the case of a WAN base station 312 may be a System ID (SID), a Network ID (NID), a Base Station ID (BSID) and/or latitude and longitude information. The identifier in the case of an access point 324 may be a Service Set Identifier (SSID) and/or a MAC address.

In some cases, the access points 324 move too frequently to be useful for determining the location of the mobile device 100. For example, the owners of access points 324 are generally free to move the hardware (i.e., the wireless transceivers) to suit their needs and the location of the access points 324 may not be recorded in a database. In general, the position information associated with access points 324 can be stored within the access point almanac 344b. For example, each access point 324 may include a SSID and/or MAC address as identifier information. Other characteristics of the WAN base stations 312 and access points 324 could be used in uniquely identifying the WAN base station 312 and access points 324 respectively. For example, if two WAN base stations, or access points, had the same station identifier, but only one supported a particular communication standard, the two could be uniquely identified. Also stored in the base station almanac 344a and the access point almanac 344b is location information that is associated with the WAN base stations 312 and access points 324 respectively. As an example, and not a limitation, the location information can be determined for each WAN base station 312 or access point 324 by performing surveys of the area, for example, with wireless devices and/or with GNSS-enabled survey equipment. The location information can include a trustworthiness value for each WAN base station 312 and access point 324. The trustworthiness value can be a numerical value between 0 and 1 (e.g., a percentage), or other values which can be compared to determine a relative difference. For example, a location of a particular WAN base station 312 may be known and thus will have a high trustworthiness value, and location of an access point 324 may be based on an estimate and therefore will have a low trustworthiness level. The opposite may also be true. The location information stored in the respective almanacs 344a, 344b for each of the WAN base stations 312 and access points 324 can be used to determine the trustworthiness of a position estimate for a mobile device 100. The almanacs 344a, 344b may also be used to modify the trustworthiness levels associated with a particular WAN base station 312 or access point 324 based on the trustworthiness levels of other WAN base stations 312 or access points 324 that are received by the mobile device 100. This embodiment shows the almanac processor 322 is separate from the WAN base stations 312, and access points 324, but in other embodiments, each cooperative WAN base station 312 and access point 324 could have an almanac processor 322.

The almanac processor 322 could be implemented with a computer or network of computers either in a single location or distributed across a number of locations. The almanacs 344a, 344b could be centrally located, but other embodiments could distribute the almanacs 344a, 344b regionally or in portions relevant to a particular WAN base station 312, or particular access point 324. The base station almanac 344a and the access point almanac 344b can be a single almanac. In an example, a first WAN base station 312-1, may store a portion of the base station almanac 344a for its footprint and all adjacent base station footprints as a local almanac 358-1. The footprint can be based on the Maximum Antenna Range (MAR) of a base station, or other geographic constraints which may impact the operational performance of the base station. As the various local almanacs 358 are updated, those changes are propagated to the centrally-located base station almanac 344a.

Figure 4:
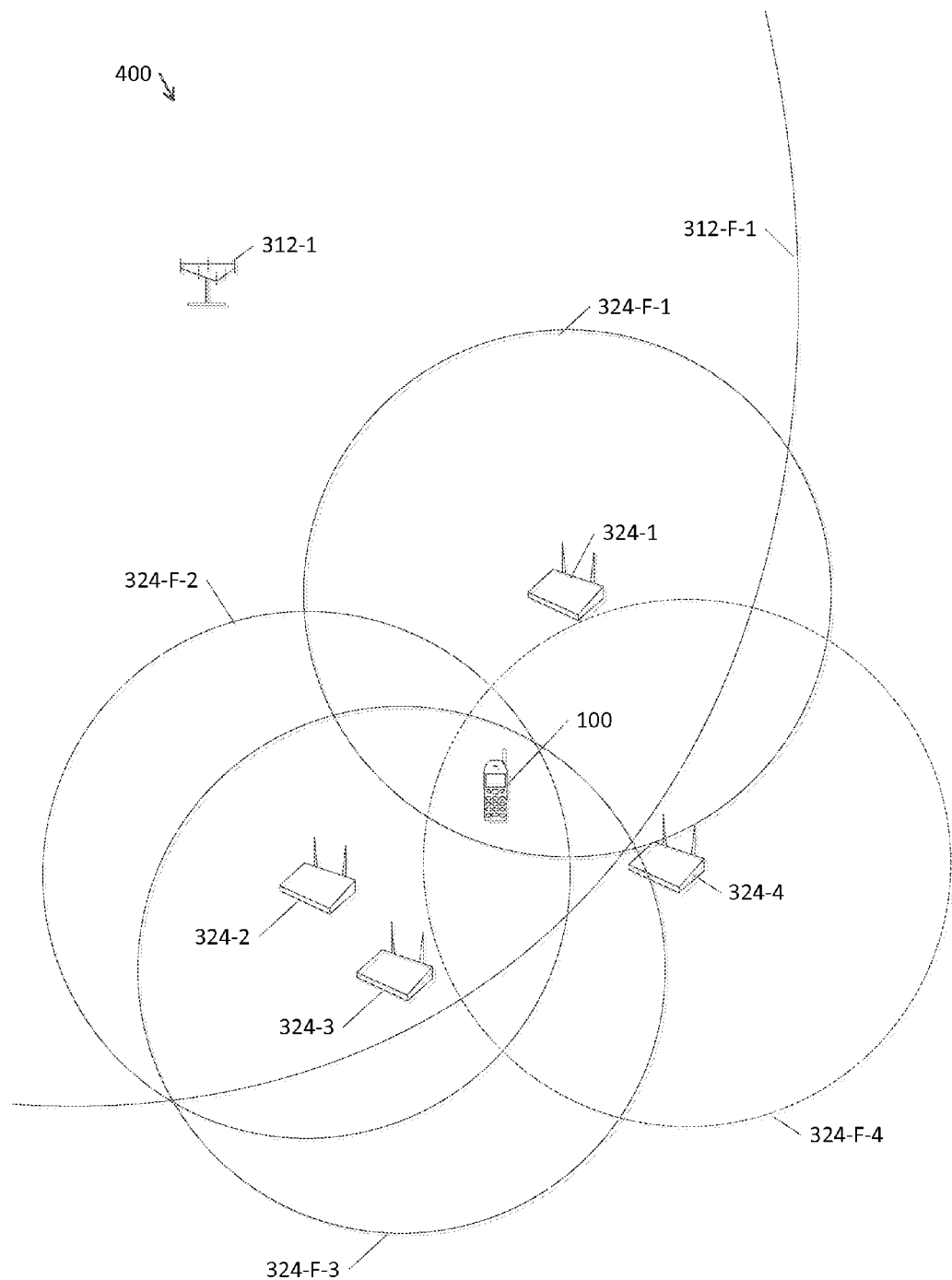
FIG. 4 is a wireless network including an access point with a suspect trustworthiness value.

Referring to FIG. 4, with further reference to FIG. 3, a wireless network 400 including an access point 324-4 with a suspect trustworthiness value is shown. The mobile device 100 is configured to receive signals from the WAN base station 312, and the access points 324-1, 324-2, 324-3, 324-4

(collectively referred to as 324). Each of the WAN base station 312 and access points 324 includes an area of coverage 312-F, 324-F (e.g., 312-F-1, 324-F-1, 324-F-2, 324-F-3, 324-F-4) respectively. In this example, the area of coverage for each of the WAN base station and access points is shown as a circular shape, but other geometric shapes may be used. The area of coverage can be computed or determined by a survey and stored in the almanacs 344a. 344b. The mobile device 100 is within the footprint 312-F-1 of the WAN base station 312-1. The location of the WAN base station 312-1 is known and maintained by a service provider and therefore the trustworthiness level associated with the WAN base station 312-1 can be relatively high (e.g., 0.80, 0.90, 0.95, 0.98). The mobile device also detects a MAC address for each of the four access points 324. The corresponding footprints 324-F for each of the access points 324 can be stored in the almanacs 344a, 344b and a position estimate can be determined based on the overlapping footprints 324-F. In some situations, the trustworthiness level associated with each of the access points 324 may be relatively low (e.g., 0.5, 0.4, 0.1) due to the mobility associated with the access point hardware, or potential issues with the data in the almanac (e.g., stale data, inaccurate location of the antenna, use of a general footprint model).

In an embodiment, the almanac processor 322 can execute an algorithm to cross-check the trustworthiness level for the WAN base station 312-1 (i.e., a WAN base station trustworthiness level) with the trustworthiness level for each of the access points 324, or a trustworthiness level associated with an estimated position based on the access points 324 (i.e., an access point trustworthiness level). In this example, the trustworthiness level of the WAN base station 312 is higher than the trustworthiness values of the access points 324. If the estimated locations of the access points 324 correspond with the known location of the WAN base station 312-1, then the trustworthiness level for each of the access points can be increased. That is, the trust in the location information for the WAN base station 312-1 can be imputed to the access points 324. The corresponding data in the almanac 344b can be updated accordingly. Conversely, if the estimated locations of the access points 324 did not corroborate with the WAN base station 312, then the trustworthiness levels associated with one or more of the access points 324 can be decreased.

An example of decreasing the trustworthiness level of an access point could be as follows. The location information in the access point almanac 344b for access point 324-4 indicates that access point 324-4 is miles away from WAN base station 312-1 and the access points 324-1, 324-2, 324-3. The MAC address for access point 324-4, however, is detected by the mobile device 100 concurrently with the BSID for WAN base station 312-1, and the MAC addresses for access points 324-1, 324-2, 324-3. Thus, the corresponding location and footprint information does not corroborate with either the WAN base station 312, or the access points 324-1, 324-2, 324-3 (e.g., the access point 324-4 may have been moved from a previous location to the location as shown in FIG. 4, or the data in the access point almanac 344b may be corrupted). The actual access point footprint 324-F-4 on FIG. 4 is depicted with a dashed line to highlight that the mobile device 100 is detecting the uncorroborated access point 324-4. In this scenario, the trustworthiness level of only access point 324-4 is decreased and its corresponding location information can be removed from the position estimate process. In an embodiment, after a number of detection cycles, the trustworthiness level of access point 324-4 can be increase. For example, if the access point 324-4 is repeatedly detected and corroborated with the WAN base station 312-1, and the other access points 324-1, 324-2, 324-3.

Figure 5:
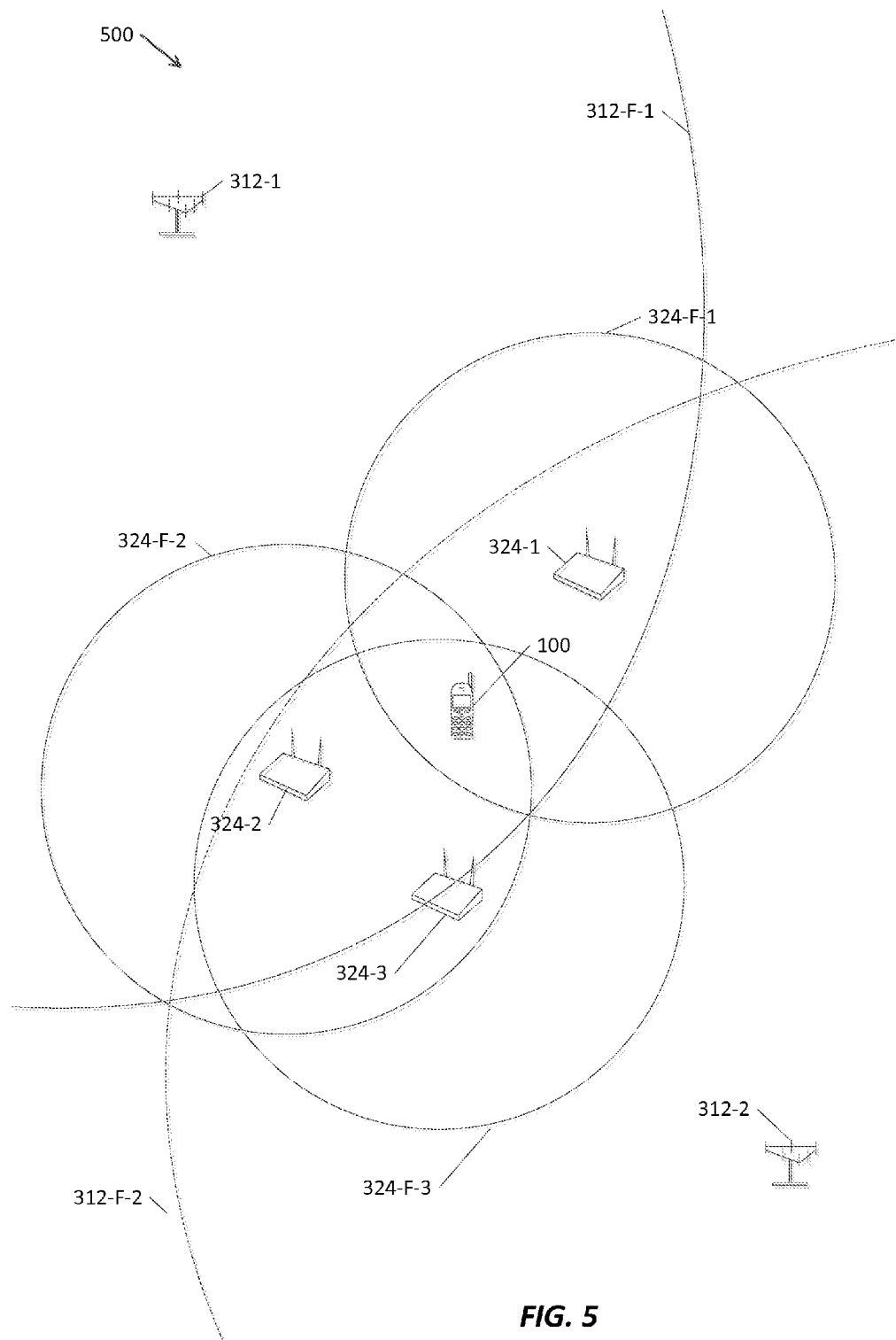
FIG. 5 is a wireless network including a WAN base station with a suspect trustworthiness value.

Referring to FIG. 5, with further reference to FIGS. 3 and 4, a wireless network 500 including a WAN base station 312-2 with a suspect trustworthiness value is shown. In some regions of the world, the trustworthiness of location data in an almanac for WAN base stations 312 can be less than that of access points 324. In the network 500, for example, the mobile device 100 can receive station identifying information (e.g., BSA, SSID, MAC addresses) from WAN base stations 312-1, 312-2, and access points 324-1, 324-2, 324-3. The almanac processor 322 can receive the station identifying information and determine if the associated location information in the almanacs 344a, 344b for each of the WAN base stations 312-1, 312-2 and the access points 324-1, 324-2, 324-3 corroborate with one another. The trustworthiness values and location information associated with the first WAN base station 312-1, and the access points 324-1, 324-2, 324-3 are corroborated and thus the corresponding almanac information can be used to create an estimated position. If the mobile device 100 also detects identifying information for a second WAN base station 312-2, the trustworthiness value for the WAN base station 312-2 can be compared to the WAN base station 312-1 and the access points 324-1, 324-2, 324-3. If the trustworthiness level of the second WAN base station 312-2 is relatively low, and the extent of the footprint 312-F-2 is not known, the location information associated with the WAN base station 312-2 may not be used in determining a position estimate.

In an embodiment, the trust in the location information associated with an AP network can be transferred to a WAN base station. In an example algorithm, the trustworthiness levels associated with the access points 324-1, 324-2, 324-3 can be used to increase the trustworthiness level of the suspect WAN base station 312-2. For example, the mobile device 100 can detect the MAC addresses for the access points 324-1, 324-2, 324-3 and a base station address for the second WAN base station 312-2. The access points 324-1, 324-2, 324-3 may have a higher trustworthiness level than the second WAN base station 312-2. If the location information associated with the second WAN base station 312-2 corroborates with the location information of the access points 324-1, 324-2, 324-3, the trustworthiness level of the second WAN base station 312-2 can be increased.

Figure 6:
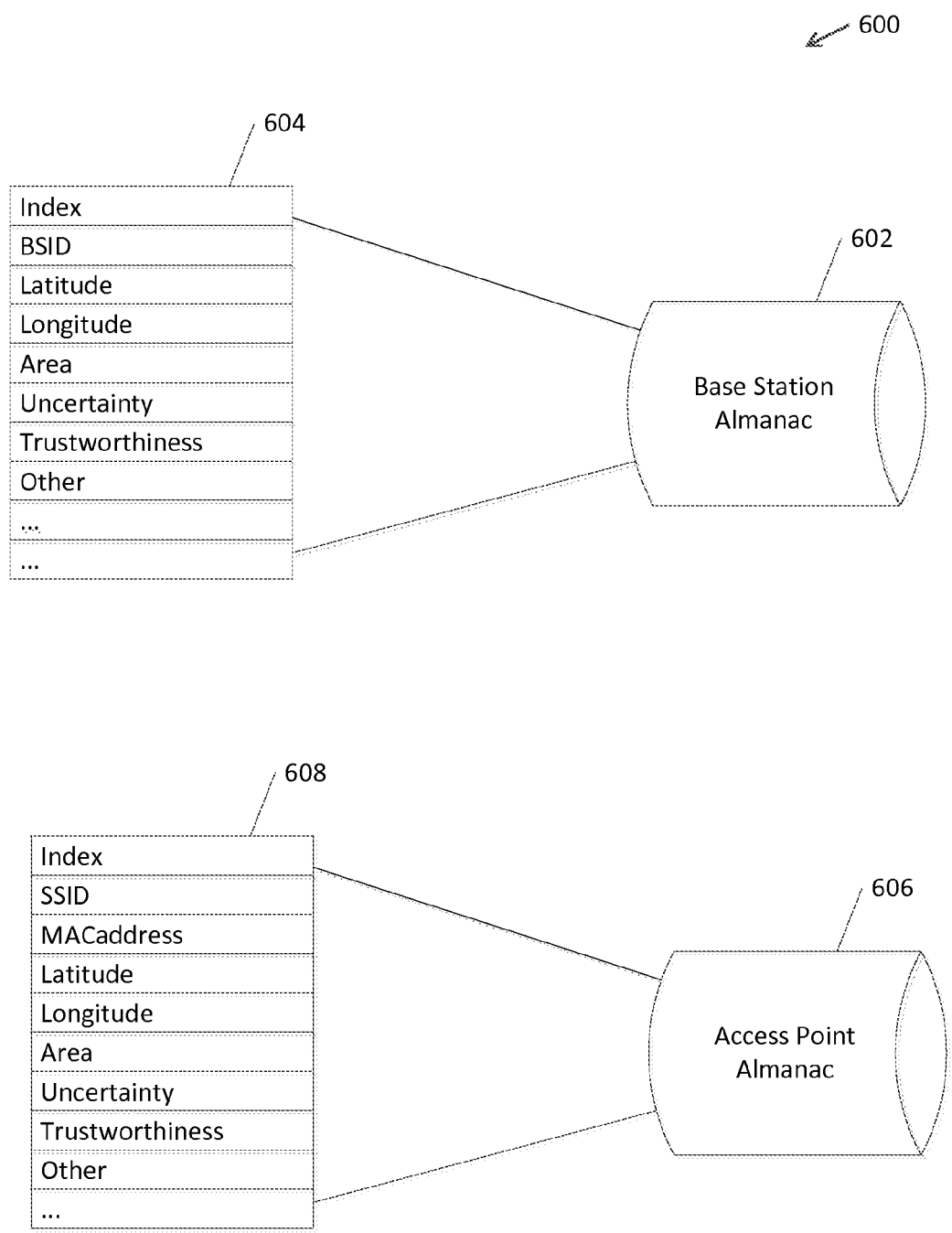
FIG. 6 includes exemplary data structures for location information.

Referring to FIG. 6, with further reference to FIG. 3, an exemplary data structure 600 for location information is shown. The data structure 600 is exemplary only and not a limitation as additional tables and fields may be used. The data structure 600 can persist in a base station database and can include a base station almanac 602 and an access point almanac 606. The base station almanac 602 may contain WAN base station information, and the access point almanac 606 may contain access point information. For example, the almanacs 602, 606 can be one or more relational databases with a collection of tables. The location server 250 can include a relational database comprising a base station almanac 602 and an access point almanac 606. Some or all of the data within the almanacs 602, 606 may also be stored on the mobile device 100. The almanacs 602, 606 can include one or more tables (i.e., data structures) 604, 608 containing data fields for location information. The data fields can be of data types as known in the art (e.g., number, char, varchar, date, etc. . . . ). The base station almanac 602 may can include multiple fields to represent a WAN base station such as a BSID, the latitude and longitude of a base station, the coverage area (e.g., footprint) of a base station, an uncertainty value, and a trustworthiness value. Other fields such as the WAN base station's altitude and other operating and signal parameters may also be used. The access point almanac 606 may can include multiple fields to represent an access point such as a SSID, MAC address, the latitude and longitude of a access point, the coverage area (e.g., footprint) of an access point, an uncertainty value, and a trustworthiness value. Other fields such as the access point's altitude and other operating and signal parameters may also be used. In an embodiment, the data structures 604, 608 can be combined within a single table.

Figure 7:
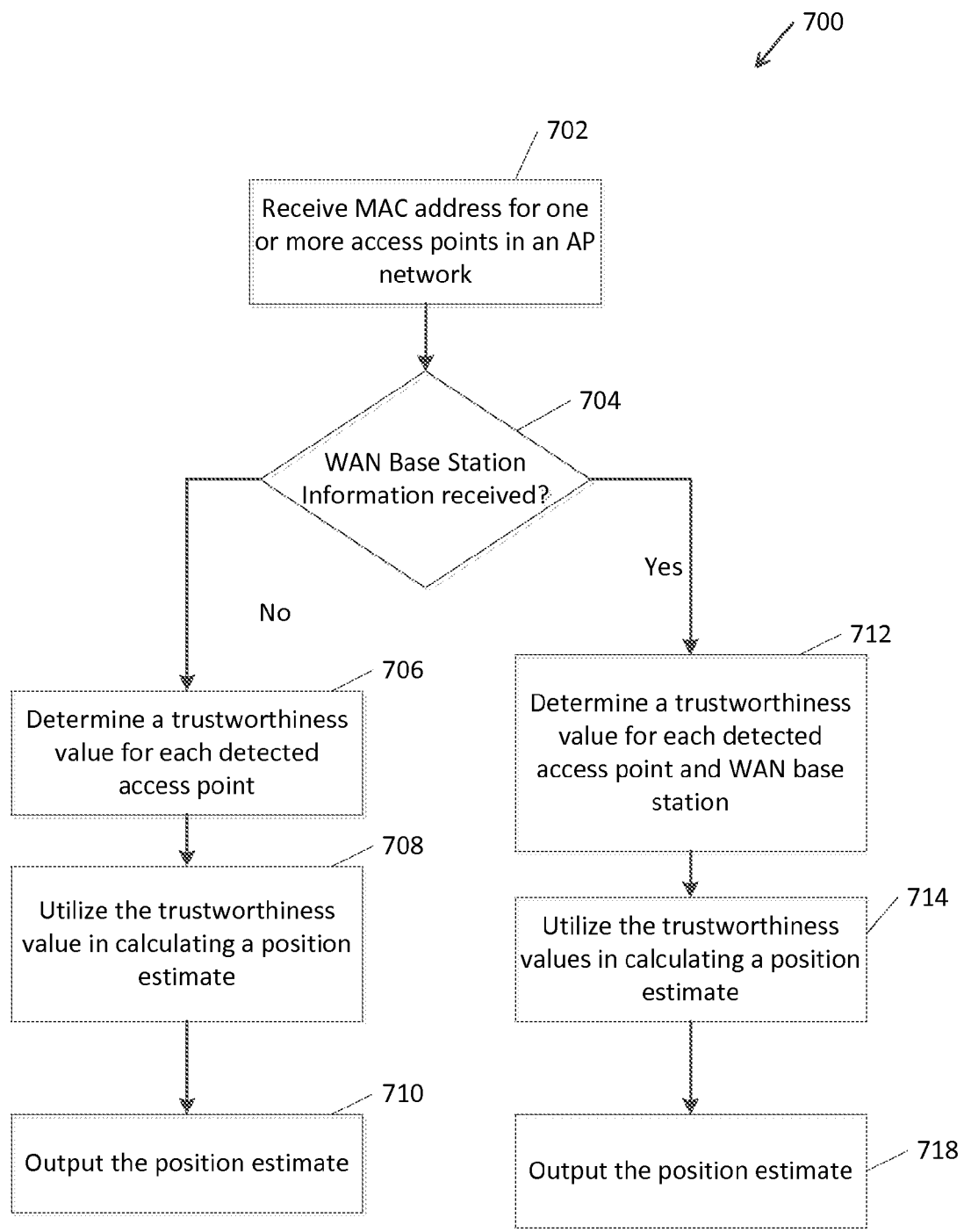
FIG. 7 is a flow diagram of an embodiment of a process for utilizing trustworthiness factors when providing a position estimate.

In operation, referring to FIG. 7, with further reference to FIG. 3, a process 700 for utilizing trustworthiness factors when providing a position estimate using the system 300 includes the stages shown. The process 700, however, is exemplary only and not limiting. The process 700 may be altered, e.g., by having stages added, removed, or rearranged.

At stage 702, a mobile device 100 can receive ID information (e.g., SSID, MAC address) for one or more access points in an AP network. In an embodiment the mobile device 100 does not, or cannot, participate on a WAN but is capable of receiving signals from access points 324. In another embodiment, the mobile device 100 is on a WAN (e.g., cellular network) and can be configured to utilize a MS-Assisted (MS-A) call flow. Other call flows and messaging systems may also be used. At stage 704, a process decision is made based on the availability of WAN signals. If WAN base station information is not received, the process determines a position estimate based on the received AP network signals. The mobile device 100 can communicate with the location server 250 via the network 230. The location server 250 can include a position determination module 340, an almanac processor 322, and almanacs 344*a*, 344*b*.

At stage 706, the trustworthiness value for each detected access point is determined. The trustworthiness values can be stored in an almanac on the location server 250 or may be stored locally in the mobile device 100. The trustworthiness value can be a field within a data structure 608 that is associated with a particular access point (e.g., via a MAC address or other base station identifier).

At stage 708, a position estimate based on location information associated with the detected access points can be calculated. The data structure 608 can include location information such as the latitude and longitude of the received access point, an expected footprint, an uncertainty factor, and a trustworthiness factor. In an embodiment, an estimated position can be calculated by determining the intersection of the coverage areas. Other positioning techniques such as trilateration may be used. An uncertainty value may also be applied to the position estimate. In an embodiment, the trustworthiness factor of each station is used to calculate the position estimate. For example, access points with trustworthiness values which are below a predetermined threshold can be eliminated from the position estimate. The trustworthiness values can be used to weight the position calculation such that the untrustworthy stations have a smaller impact on the final position estimate. At stage 710, the position estimate can be output to another application (e.g., displayed to the user, utilized by other location based services).

When the mobile device 100 is in a WAN, the location information provided by a WAN base station 312 may be used in the position estimate. At stage 712, the trustworthiness value of one or more WAN base stations 312 is determined. The trustworthiness levels for the access points 324 are also determined. The trustworthiness levels may be stored on almanacs 344*a*, 344*b*, 358 or locally on the mobile device 100. At stage 714 a position estimate is calculated based on the trustworthiness levels of all of the received WAN base stations 312 and access points 324. WAN base stations and access points with low trustworthiness levels can be removed from the position determination calculation, or otherwise diminished through a weighting function. The calculation can utilize the almanac data to determine an intersection of coverage areas, compare received signal strengths, perform trilateration operations, or other position determining techniques as known in the art. The position estimate can be provided (i.e., output) to the user, or other application, at stage 718.

Figure 8:
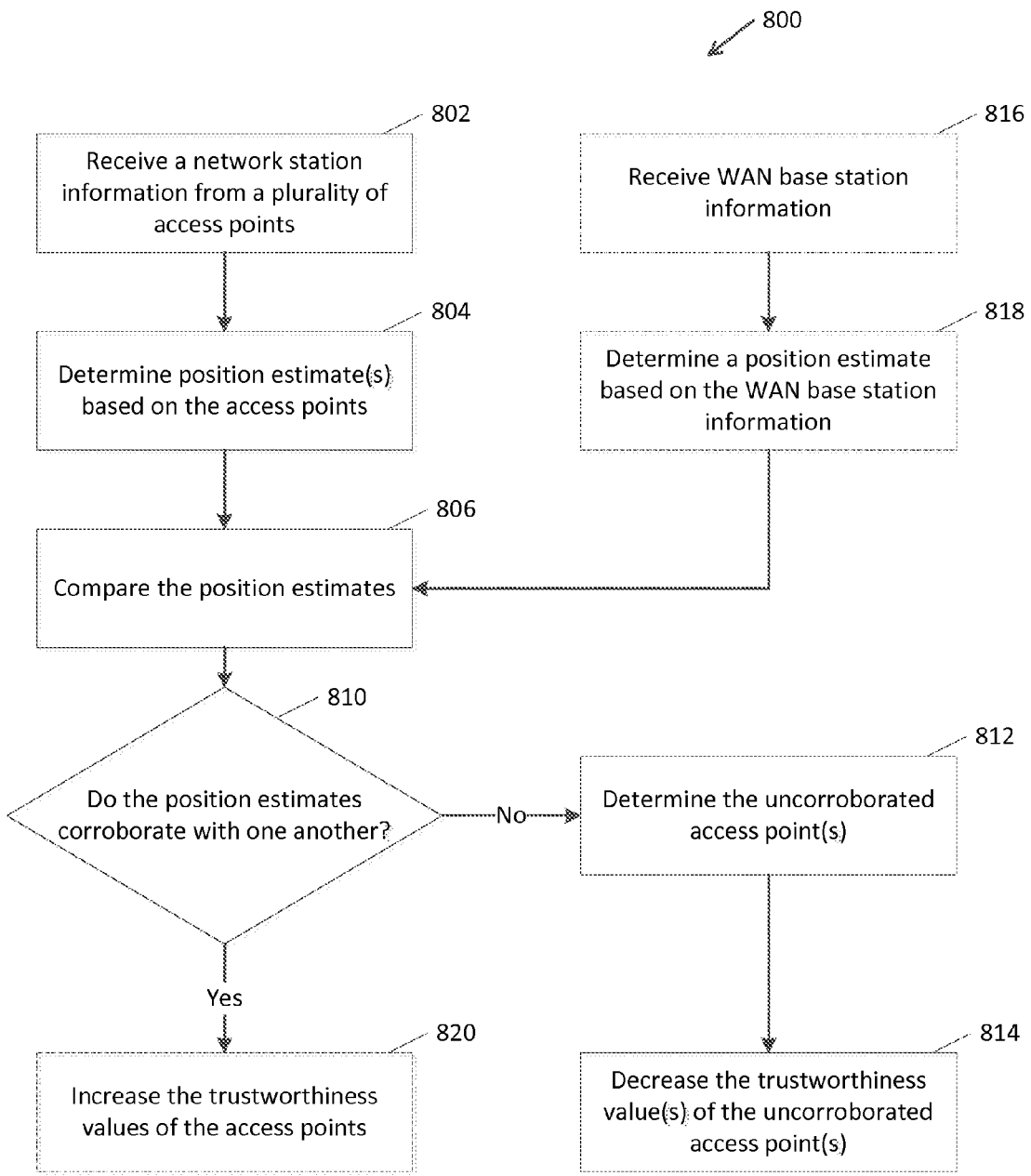
FIG. 8 is a flow diagram of an embodiment of a process for transferring trust between access points.

In operation, referring to FIG. 8, with further reference to FIG. 3, a process 800 for transferring trust between access points using the system 300 includes the stages shown. The process 800, however, is exemplary only and not limiting. The process 800 may be altered, e.g., by having stages added, removed, or rearranged.

At stage 802, a mobile device can receive network station information from two or more access points 324. In an embodiment, the mobile device 100 can cross reference an access point MAC address, or other access point identifier, with a remote or local almanac (e.g., access point almanac 344*b*). Location information associated with the access point can be retrieved for use in a position estimating process. The position estimating process can occur locally (i.e., on the mobile device 100) or on a remote location server 250. At stage 804 the position determination module 340, or the mobile device 100, can determine one or more position estimates based on the received access points 324. For example, the position estimate for an access point 324 may be an area defined by the footprint 324-F of the access point. In an embodiment, the position estimate for a particular access point 324 can be based on the received signal strength, or other positioning techniques. An uncertainty value can be used in the positioning process. An exemplary algorithm can utilize the information contained in the access point almanac 344*b* associated with the access points 324 to determine one or more estimated positions of the mobile device 100. The algorithm can then compare the position estimates associated with the access points 324 with one another at stage 806. For example, the comparison may determine whether the footprints 324-F overlap, or determine a distance between the estimated positions.

At stage 810 a decision is made on whether the position estimates corroborate with one another. Determining if the position estimates corroborate can occur on remote location server 250, or on the mobile device 100. The corroboration of position estimates can mean that the one or more estimated positions of the mobile device 100 based the received access points 324 are within an acceptable distance from one another. A corroborated position can mean that the mobile device 100 is within the expected footprints 324-F of each of the access points 324. Other multivariate corroboration or correlation techniques may be used to analyze the position estimates and determine if any results are outliers for the group. For example, an uncorroborated position estimated can be one that is outside the footprint 324-F of the other access points, or returns a position estimate that is a distance away from the other position estimates. Moving the location of an access point without updating the corresponding location information (e.g., lat./long./alt., area) can lead to an uncorroborated position estimate. Other database errors or signal strength issues may also create an uncorroborated position estimate.

If one or more of the position estimates do not corroborate, the corresponding access point 324 are identified at stage 812. Once an access point 324 is identified, the trustworthiness value for the access point 324 can be decreased at stage 814. As previously discussed, an access point (or WAN base station) with a decreased trustworthiness value can be removed from a position estimating process, or down weighted to reduce its contribution to the final position estimate.

Stages 816 and 818 are optional. In an embodiment, if the mobile device 100 is within the footprint 312-F-1 of a WAN base station 312-1, then one or more position estimates based on the WAN base station information can be used in the comparison at stage 806.

Stage 820 is optional. In an embodiment, if the position estimates of the access points 324 corroborate to one another, then their respective trustworthiness values can be increased by some amount. As discussed, an increase in trustworthiness can impact subsequent position estimate calculations. If a network includes both WAN base stations 312 and access points 324, the trust from the WAN base stations 312 can be transferred to the access points 324. For example, assuming that a position estimate of a high trustworthiness WAN base station is included in the comparison at stage 806, and the position estimates derived from the WAN base station(s) 312 and the low trustworthiness access point(s) 324 (i.e., only one access point is needed for this example) corroborate, then the trustworthiness factor of the access point 324 can be increased up to the level of trustworthiness for the WAN base station 312.

Figure 9:
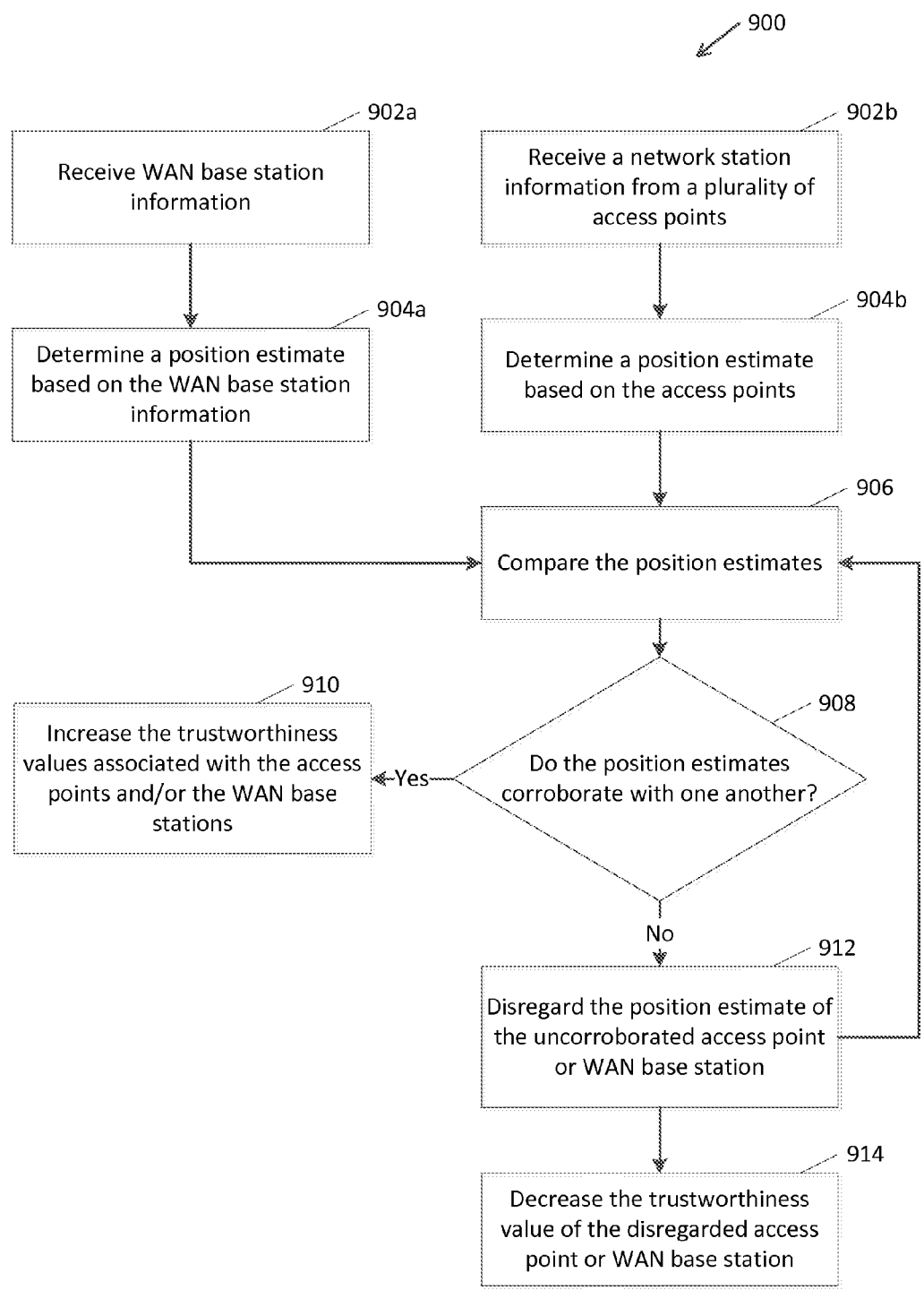
FIG. 9 is a flow diagram of an embodiment of a process for transferring trust between access points and WAN base stations.

In operation, referring to FIG. 9, with further reference to FIG. 3, a process 900 for transferring trust between access points and WAN base stations using the system 300 includes the stages shown. The process 900, however, is exemplary only and not limiting. The process 900 may be altered, e.g., by having stages added, removed, or rearranged.

A mobile device 100 can receive network station information from WAN base stations 312 and access points 324 at stages 902a and 902b. Position estimates based on the location information (e.g., almanac data structures 604, 608) associated with the WAN base stations 312 and access points 324 can be determined at stage 904a and 904b. The processing of the location information can occur remotely on a location server 250, locally on the mobile device 100, or on a combination of both. For example, the position estimates derived from the WAN base stations 312 can be determined on the location server 250, and the position estimates derived from the access points 324 can be determined on the mobile device 100. Processors from other computers on the system may also be used. The position estimates from the WAN base stations 312 and access points 324 can be compared at stage 906. The comparison can occur on the mobile device 100 or on the location server 250.

A corroboration detection process such as previously described can occur at stage 908 and a decision on whether the position estimates are corroborated may be made. In an embodiment, the trust in a WAN network can be transferred to an AP network. Similarly, the trust in an AP network can be transferred to a WAN network. For example, if the position estimates corroborate with one another at stage 908, then the trustworthiness values of the access points and the WAN base stations can be increased. At stage 910, if the access points 324 have a higher trustworthiness value in relation to the WAN base stations 312, then the trustworthiness values associated with the WAN base stations 312 can be increased. Correspondingly, if the access points 324 have relatively low trustworthiness values, they can be increased based on the trustworthiness values of the WAN base stations 312. In an embodiment, the trustworthiness value for each of the WAN base stations 312 and the access points 324 can be increased. The increase in trustworthiness value can occur if additional conditions are met. For example, the position estimates must be within a certain range, the received signal strengths must meet a minimum value, or a minimum number of stations must be detected. Other conditions directed to the accuracy of the position estimate may also be used. For example an operator may manually update the trustworthiness level (i.e., human intervention).

At stage 912, if the position estimates are uncorroborated, then the uncorroborated access points 324 or WAN base station 312 can be disregarded and the comparison can repeat without that disregarded station. In an embodiment, if the corroboration process indicates that there are more than one uncorroborated WAN base station 312 and access points 324, then WAN base station 312 or access point 324 station with the lowest trustworthiness level can be disregarded. The process can iterate through the WAN base stations and access points in order of the trustworthiness levels until a corroboration exists, or a no solution determination is made (i.e., the number of remaining WAN base stations and access points is below a minimum). If a WAN base station or access point is disregard for a subsequent comparison at stage 912, then the trustworthiness level of that WAN base station or access point can be decreased at stage 914.

Figure 10:
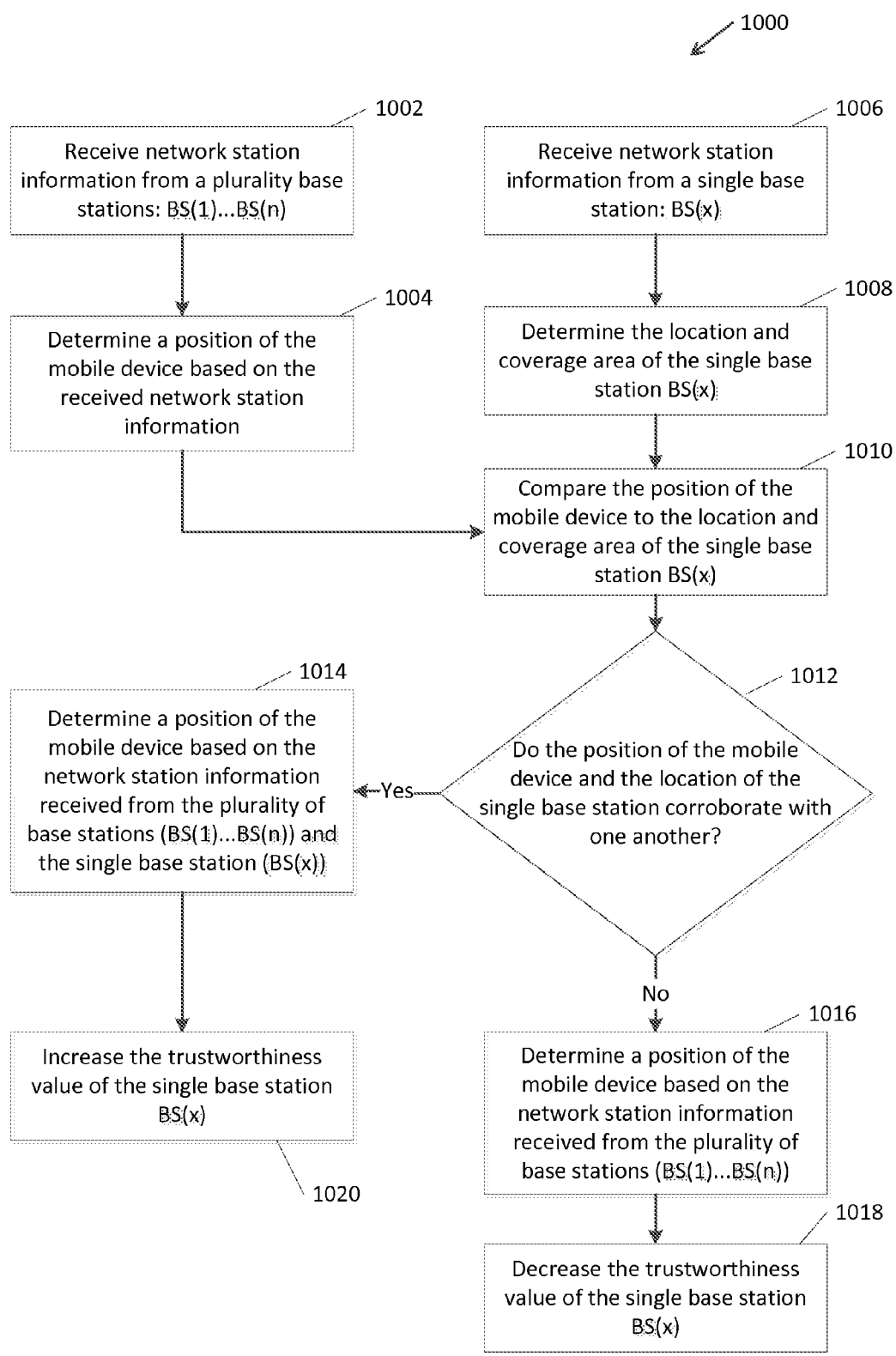
FIG. 10 is a flow diagram of an embodiment of a process for transferring trust between WAN base stations and access points based a comparison of a position estimate for a mobile device and the location of a single WAN base station and access point.

In operation, referring to FIG. 10, with further reference to FIG. 3, a process 1000 for transferring trust between WAN base stations 312 and access points 324 based a comparison of a position estimate for a mobile device 100 and the location of a single WAN base station or access point is shown. The process 1000, however, is exemplary only and not limiting. The process 1000 may be altered, e.g., by having stages added, removed, or rearranged.

At stage 1002 the position determination module 340, or the mobile device 100, can receive network station information from a plurality of WAN base stations 312 and access points 324. The notation BS(1) ... BS(n) on FIG. 10 is used to indicate that a base station (BS) can be either a WAN base station 312 or an access point 324. For example, BS(1) can be WAN base station 312-1, BS(2) can be access point 324-1, and BS(3) can be WAN base station 312-2. Other combinations of WAN base stations 312 and access points 324 can be used. The network station information can include one or more of the data fields contained in the data structure 600. For example, the mobile device 100 can receive the MAC addresses, SSID, and/or Base Station IDs (i.e., address information) from a plurality of base stations (e.g., BS(1), BS(2), BS(3) ... BS(n)), and then transmit that information over the communication link 132. The position determination module 340 can receive the address information and then query the base station almanac 344a and access point almanac 344b to receive the associated fields in the data structure 600.

At stage 1004, the received network station information may be processed to determine a position of the mobile device 100. In an embodiment, a position determining algorithm can be executed on the position determination module 340 (i.e., remotely). The position determining algorithm can also be executed on the mobile device 100 (i.e., locally). For example, a positioning determining algorithm can utilize the received signal strength of the base stations (e.g., BS(1), BS(2), BS(3) ... ), or an estimated position can be calculated by determining the intersection of the coverage areas for the base stations. Other positioning algorithms such as trilateration may also be used. In an embodiment, the algorithm can use the trustworthiness factor of each base station (e.g., BS(1), BS(2), BS(3) ... ) to calculate the position estimate. For example, stations with trustworthiness values which are below a predetermined threshold can be eliminated from the position estimate. The trustworthiness values can be used to weight the position calculation such that the untrustworthy stations have a smaller impact on the final position estimate.

At stage 1006 the position determination module 340, or the mobile device 100, can receive network station information from a single WAN base station 312 or access point 324. The notation BS(x) on FIG. 10 is used to indicate that the base station BS(x) can be either a WAN base station 312 or an access point 324. The notation BS(x) may also indicate a serving cell or sector associated with a WAN base station 312. For this example, the single base station BS(x) is not one of the plurality of base stations BS(1) . . . BS(n) described in stage 1002. The received network station information can include one or more of the data fields contained in the data structure 600. For example, the mobile device 100 can receive the MAC addresses, SSID, and/or Base Station ID (i.e., address information) from the base station BS(x), and then transmit that information over the communication link 132. The position determination module 340 can receive the address information and then query the base station almanac 344a and access point almanac 344b to receive the associated fields in the data structure 600. For example, at stage 1008, the data structure 600 includes geographic coordinates (e.g., latitude and longitude) and a coverage area for the base station BS(x). The position determination module 340, or the mobile device 100, can utilize this information to determine the expected location and coverage area of the single base station BS(x) (i.e., the location as stored in the almanac 344a, 344b).

At stage 1010 the location of the mobile device 100 is compared to the location and coverage area of the single base station BS(x). In general, the coverage area of any base station indicates the range or footprint of the base station. A mobile device that is located within coverage area of a base station can communicate with the base station. The coverage area can be polygon or other representation of a geographic area that is stored in the data structure 600. The coverage area may also be computed based on expected transmission performance as known in the art. For example, the expected coverage area of a WAN base station 312-1 can be defined by a circle 312-F-1 with a radius of 1 km, and the expected coverage area of an access point 324-1 can be defined by a circle 324-F-1 with a radius of 100 m. Other radius values may be used to determine the coverage area of a base station. For example, a WAN base station 312 may be a serving cell and the coverage area is defined by a sector. The position determination module 340, or mobile device 100, can utilize a spatial comparison or distance determination algorithms to compare the position of the mobile device (e.g., as calculated using network station information associated with base stations BS(1) . . . BS(n)) with the coverage area of the single base station BS(x). At stage 1012 the position determination module 340 (or the mobile device 100) can determine whether the position of the mobile device 100 corroborates with the position of the single base station BS(x). The corroboration can mean that the mobile device 100 is within the expected coverage area of the single base station BS(x).

If the position of the mobile device 100 and the single base station BS(x) corroborate with one another, than at stage 1014 the position determination module 340 utilizes position determination algorithm and the network station information from both the plurality of base stations (i.e., BS(1) . . . BS(n)) and the single base station (i.e., BS(x)) to determine the position of the mobile device 100. As previously described, the position determination algorithm can utilize the trustworthiness values to determine the position of the mobile device 100. For example, if the trustworthiness value of the single base station BS(x) is higher than the trustworthiness values associated with one or more the plurality of base stations BS(1) . . . BS(n), then the position determined at stage 1014 can be based on the network information associated with the single base station BS(x) and only a portion of the plurality of base stations BS(1) . . . BS(n). That is, the less trustworthy base stations can be eliminated (or otherwise downgraded) from the position determination calculation.

At stage 1020, if the trustworthiness of the single base station BS(x) is lower than the trustworthiness of the plurality of the base stations BS(1) . . . BS(n), either individually or collectively, then the trustworthiness value of the single base station BS(x) can be increased. Stage 1020 is optional and not a limitation. The amount of the increase can vary by implementation. In one example, the position determination module 340 can transfer the trustworthiness values of the plurality of base stations BS(1) . . . BS(n) to the single base station BS(x) (i.e., the trustworthiness values would be equal). In an embodiment, the trustworthiness value of the single base station BS(x) can be a weighted average based on the number of position calculations. For example, the trustworthiness value of BS(x) can increase a fixed amount (e.g., 0.05, 0.1, 0.15, etc. . . . ) for each successful corroboration at stage 1012, with an upper limit being the trustworthiness value associated with the plurality of base stations BS(1) . . . BS(n).

At stage 1016, if the position of the mobile device 100 does not corroborate with the location of the single base station BS(x), then the network station information associated with BS(x) is not used in the position determination calculation. For example, if the single base station BS(x) is physically moved and the almanac data is not updated to reflect the change in location, or the almanac data is otherwise corrupted, then the location data associated with BS(x) should not be used in the position determination algorithm.

At stage 1018, the trustworthiness value of the single base station BS(x) can be decreased. The amount of the decrease can vary based on the implementation. In an example, the position determination module 340 can set the trustworthiness value of the uncorroborated BS(x) to zero, or another value that is lower than the trustworthiness values associated with the plurality of base stations BS(1) . . . BS(n). The position determination module 340 may utilize a weighted average algorithm to decrease the trustworthiness value of BS(x). That is, for each position request in which the position of the mobile device and the location of BS(x) are uncorroborated, the trustworthiness value for BS(x) can decrease a fixed amount (e.g., 0.05, 0.1, 0.15, etc. . . . ).

Figure 11:
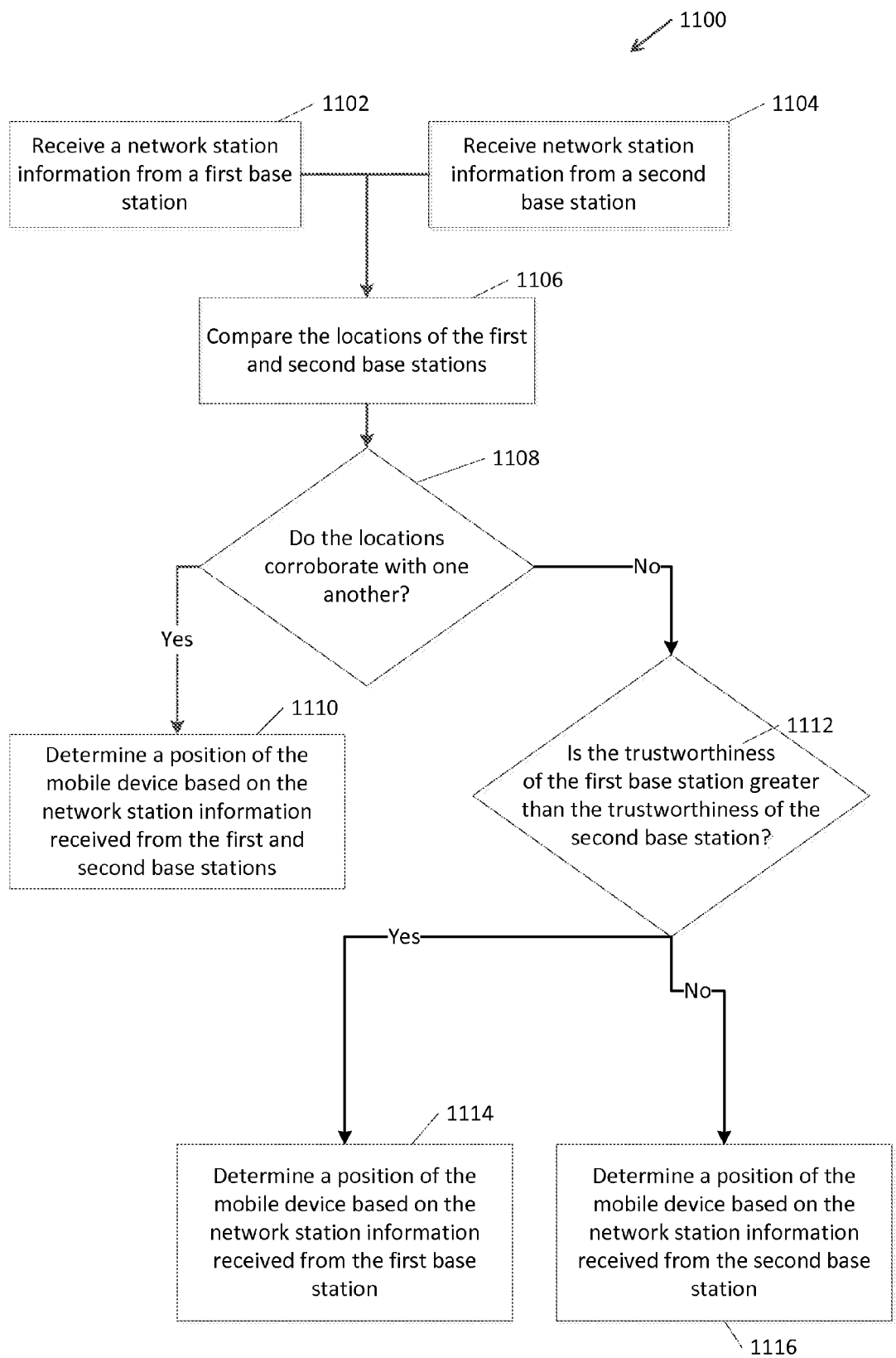
FIG. 11 is a flow diagram of an embodiment of a process for determining a position of a mobile device based on network station information received from a first and a second base station.

In operation, referring to FIG. 11, with further reference to FIG. 3, a process 1100 for determining a position of a mobile device based on network station information received from a first and a second base station is shown. The process 1100, however, is exemplary only and not limiting. The process 1100 may be altered, e.g., by having stages added, removed, or rearranged.

At stages 1102 and 1104, a mobile device 100 receives network information associated with a first and second base station respectively. In an embodiment, the position determination module 340 receives the network station information. The base stations in this example can be a WAN base station 312, an access point 324, or a combination of both. The network station information can include one or more of the data fields contained in the data structure 600. For example, the mobile device 100 can receive the MAC addresses, SSID, and/or Base Station IDs (i.e., address information) from first and second base stations, and then transmit that information over the communication link 132. The position determination module 340 can receive the address information and then query the base station almanac 344a and access point almanac 344b to receive the associated fields in the data structure 600.

At stage 1106, the position determination module 340 is configured to compare the locations associated with the first and second base stations. For example, a geographical location such as latitude and longitude is included in the data structure 600 and the position determination module can utilize a distance algorithm to determine a distance between each of the base stations. The position determination module 340 can also be configured to determine an overlap in the coverage areas for each of the first and second base stations. At stage 1108, the position determination module 340 can determine if the locations of the first and second base stations corroborate with one another. In an embodiment, the locations can corroborate with one another if the locations are within a predefined distance from one another, or if their respective coverage areas overlap.

At stage 1110, if the locations of the first and second base stations corroborate with one another then the position determination module 340 may be configured to execute a position determination algorithm to determine a position of the mobile device based on the network station information received from the first and second base stations. The position determination algorithm can utilize the trustworthiness values to determine the position of the mobile device 100. For example, if the trustworthiness value of the first base station is higher than the trustworthiness values associated with the second base station, then the position determined at stage 1110 can be weighted to favor the values associated with the first base station. That is, in an embodiment, the contribution of a corroborated but less trustworthy base station can be eliminated (or otherwise downgraded) from the position determination calculation.

At stage 1112, if the locations of the first and second base stations do not corroborate one another, and the position determination module 340 is configured to determine which of the two base stations has a higher trustworthiness value. For example, an algorithm can compare the trustworthiness values that are associated with the first and second base stations. If the first base station has a higher trustworthiness value, then at stage 1114 the position determination module 340 utilizes the network station information associated with the first base station to determine the location of the mobile device 100. Conversely, if the second base station has a higher trustworthiness value, then at stage 1116, the position determination module 340 utilizes the network station information associated with the second base station to determine the position of the mobile device. If the trustworthiness values of both the first and second base stations are equal, then the position determination module 340 can be configured to use the network station information for either or both in determining the position of the mobile device. In an example, the base station with the smaller MAR (Maximum Antenna Radius) can be sued to determine the location of the mobile device.

Figure 12:
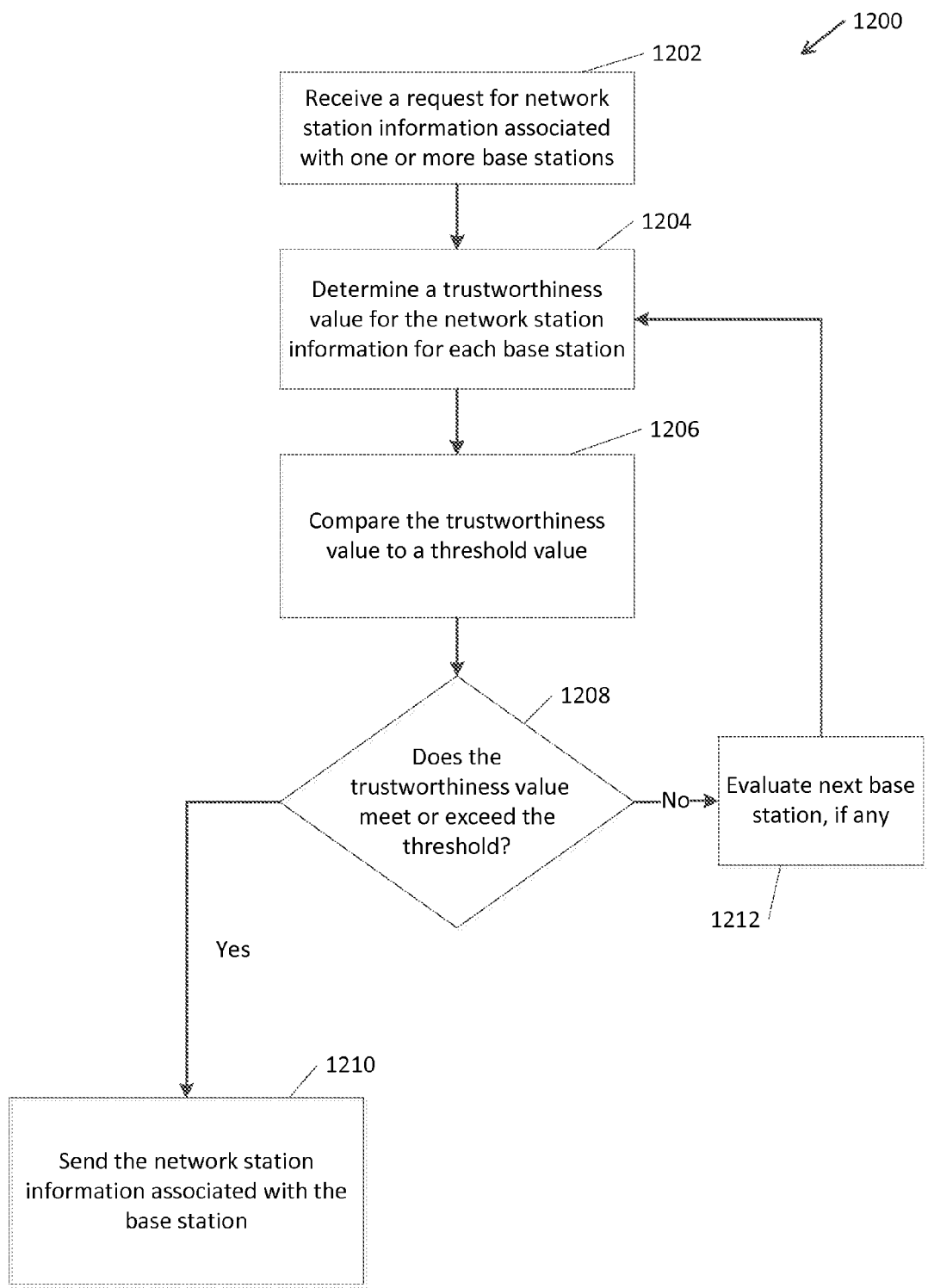
FIG. 12 is a flow diagram of an embodiment of a process for sending network station information based on a trustworthiness value.

In operation, referring to FIG. 12, with further reference to FIG. 3, a process 1200 for sending network station information based on a trustworthiness value is shown. The process 1200, however, is exemplary only and not limiting. The process 1200 may be altered, e.g., by having stages added, removed, or rearranged.

At stage 1202 the position determination module 340 can receive a request for network station information that is associated with one or more base stations. In this example, the term base station can be a WAN base station 312 or an access point 324. In general, the request for the network information can originate from a mobile device 100, or from within the position determination module 340. For example, a position determining algorithm executing in the position determination module can include a function for retrieving network station information from the almanacs 344a, 344b. At stage 1204, the position determination module 340 can determine the trustworthiness value for each base station and compare the trustworthiness values to a threshold value at stage 1206. The threshold value can be one or more predetermined values stored in the memory of the position determination module (e.g., a look-up table). As an example, and not a limitation, the threshold value can correspond to other system parameters such as type of mobile device, time of day, and the number of base stations in the request. At stage 1208, the position determination module 340 can be configured to determine if the trustworthiness values for each of the request base stations meets or exceeds the threshold value. That is, the position determination module 340 will send only the trustworthy network station information (i.e., those which meet an established threshold) at stage 1210, or evaluate another requested base station at stage 1212. The trustworthy network information can be sent serially or in a batch.

As an example of operation, the mobile device 100 can detect of plurality of MAC addresses and/or BSIDs for a plurality of base stations. The mobile device 100 can send these addresses to the position determination module 340 via one or more communication links 123, 132. The position determination module 340 can execute an API call including the MAC, BSID or other identifying information to the almanac processor 322. In an embodiment, the API call can be a SQL stored procedure that is stored on the almanac processor 322. In general, this stored procedure executes a select query on one or more of the almanacs 344a, 344b based on the identifying information. The query can also include a threshold value as either a fixed parameter in the query, or as a variable within the API call. This threshold value may be used to filter the results of the select query. When the query is executed, the almanac processor 322 returns the network station information associated with identifying information if the network station information is trustworthy (i.e., meets or exceeds the threshold value). The trustworthy network station information can be sent to the position determination module 340 and/or the mobile device 100 to be used by a position determination algorithm.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. For example, position determination algorithms can be executed within the position determination module 340, or within the mobile device 100.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Position determination and estimation techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of using a mobile device to transfer trust between networks, comprising:
receiving a WAN base station information including a WAN base station trustworthiness value;
determining a WAN position estimate for the mobile device based on the WAN base station information;
receiving an access point information including an access point trustworthiness value;
determining an access point position estimate for the mobile device based on the access point information;
determining if the WAN position estimate and the access point position estimate are corroborated; and
increasing the access point trustworthiness value if the WAN position estimate and the access point position estimate are corroborated and the WAN base station trustworthiness value is higher than the access point trustworthiness value.

2. A method of using a mobile device to transfer trust between networks, comprising:
receiving a WAN base station information including a WAN base station trustworthiness value;
determining a WAN position estimate for the mobile device based on the WAN base station information;
receiving an access point information including an access point trustworthiness value;
determining an access point position estimate for the mobile device based on the access point information;
determining if the WAN position estimate and the access point position estimate are corroborated; and
increasing the WAN base station trustworthiness value if the WAN position estimate and the access point position estimate are corroborated and the access point trustworthiness value is higher than the WAN base station trustworthiness value.

3. The method of claim 1, comprising:
determining a combined position estimate based on the WAN base station information and the access point information, wherein WAN base station trustworthiness value and the access point trustworthiness value are used to weight the WAN base station information and the access point information respectively; and
outputting the combined position estimate.

4. A system for transferring trust between network base stations, comprising:
a base station database operative to maintain a database identifying a plurality of WAN base stations and corresponding WAN location information, and a plurality of access points and corresponding access point location information, wherein the WAN location information includes a WAN trustworthiness value for each of the plurality of WAN base stations, and the access point location information includes an access point trustworthiness value for each of the plurality of access points;
a position determination module configured to:
determine a WAN position estimate for a mobile device based on the WAN location information corresponding to a WAN base station that is in communication with the mobile device;
determine an access point position estimate for the mobile device based on the access point location information corresponding to an access point that is in communication with the mobile device;
an almanac processor configured to:
compare the WAN trustworthiness value associated with the WAN base station and the access point trustworthiness value associated with the access point;
determine if the WAN position estimate and the access point position estimate are corroborated;
increase the access point trustworthiness value if the WAN position estimate and the access point position estimate are corroborated and the WAN trustworthiness value higher than the access point trustworthiness value; and
increase the WAN trustworthiness value if the WAN position estimate and the access point position estimate are corroborated and the WAN trustworthiness value is lower than the access point trustworthiness value.

5. The system of claim 4, wherein the position determination module is configured to determine a combined position estimate based on a weighted WAN position estimate and a weighted access point position estimate, wherein the WAN trustworthiness value and the access point trustworthiness value are used to weight the WAN position estimate and the access point position estimate respectively.

6. The system of claim 4, wherein the position determination module is configured to determine the access point position estimate of the mobile device based on location information corresponding to a plurality of access points that are in communication with the mobile device.

7. The system of claim 4, wherein the position determination module is configured to determine the WAN position estimate of the mobile device based on location information corresponding to a plurality WAN base stations that are in communication with the mobile device.

8. An apparatus for transferring trust between networks, comprising:
means for receiving a WAN base station information including a WAN base station trustworthiness value;
means for determining a WAN position estimate for a mobile device based on the WAN base station information;
means for receiving an access point information including an access point trustworthiness value;
means for determining an access point position estimate for the mobile device based on the access point information;
means for determining if the WAN position estimate and the access point position estimate are corroborated; and
means for increasing the access point trustworthiness value if the WAN position estimate and the access point position estimate are corroborated and the WAN base station trustworthiness value is higher than the access point trustworthiness value.

9. An apparatus for transferring trust between networks, comprising:
means for receiving a WAN base station information including a WAN base station trustworthiness value;
means for determining a WAN position estimate for a mobile device based on the WAN base station information;
means for receiving an access point information including an access point trustworthiness value;
means for determining an access point position estimate for the mobile device based on the access point information;
means for determining if the WAN position estimate and the access point position estimate are corroborated; and
means for increasing the WAN base station trustworthiness value if the WAN position estimate and the access point position estimate are corroborated and the access point trustworthiness value is higher than the WAN base station trustworthiness value.

10. The apparatus of claim 8, comprising:
means for determining a combined position estimate based on the WAN base station information and the access point information, wherein WAN base station trustworthiness value and the access point trustworthiness value are used to weight the WAN base station information and the access point information respectively; and
means for outputting the combined position estimate.

11. A computer program product residing on a processor-executable computer storage medium, the computer program product comprising processor-executable instructions configured to cause a processor to:
receive WAN base station information including a WAN base station trustworthiness value;
determine a WAN position estimate for a mobile device based on the WAN base station information;
receive an access point information including an access point trustworthiness value;
determine an access point position estimate for the mobile device based on the access point information;
determine if the WAN position estimate and the access point position estimate are corroborated; and
increase the access point trustworthiness value if the WAN position estimate and the access point position estimate are corroborated and the WAN base station trustworthiness value is higher than the access point trustworthiness value.

12. A computer program product residing on a processor-executable computer storage medium, the computer program product comprising processor-executable instructions configured to cause a processor to:
receive WAN base station information including a WAN base station trustworthiness value;
determine a WAN position estimate for a mobile device based on the WAN base station information;
receive an access point information including an access point trustworthiness value;
determine an access point position estimate for the mobile device based on the access point information;
determine if the WAN position estimate and the access point position estimate are corroborated; and
increase the WAN base station trustworthiness value if the WAN position estimate and the access point position estimate are corroborated and the access point trustworthiness value is higher than the WAN base station trustworthiness value.

13. The computer program product of claim 11, further comprising instructions configured to cause the processor to:
determine a combined position estimate based on the WAN base station information and the access point information, wherein WAN base station trustworthiness value and the access point trustworthiness value are used to weight the WAN base station information and the access point information respectively; and
output the combined position estimate.

14. A method of using a mobile device to transfer trust between networks, comprising:
receiving a plurality of first network station information from a plurality of base stations;
determining a first position estimate for the mobile device based on the plurality of first network station information;
receiving a second network station information from a single base station, wherein the single base station is not one of the plurality of base stations;
determining a location of the single base station;
determining if the first position estimate for the mobile device and the location of the single base station are corroborated; and
increasing a trustworthiness value associated with the single base station if the first position estimate for the mobile device and the location of the single base station are corroborated.

15. The method of claim 14, comprising determining a second position estimate for the mobile device based on the plurality of first network station information received from the plurality of base stations and the second network station information received from the single base station.

16. A method of using a mobile device to transfer trust between networks, comprising:
receiving a plurality of first network station information from a plurality of base stations;
determining a first position estimate for the mobile device based on the plurality of first network station information;
receiving a second network station information from a single base station, wherein the single base station is not one of the plurality of base stations;
determining a location of the single base station;
determining if the first position estimate for the mobile device and the location of the single base station are corroborated; and
decreasing a trustworthiness value associated with the single base station if the first position estimate for the mobile device and the location of the single base station are uncorroborated.

17. An apparatus for transferring trust between networks, comprising:
means for receiving a plurality of first network station information from a plurality of base stations;
means for determining a first position estimate for a mobile device based on the plurality of first network station information;
means for receiving a second network station information from a single base station, wherein the single base station is not one of the plurality of base stations;
means for determining a location of the single base station;
means for determining if the first position estimate for the mobile device and the location of the single base station are corroborated; and
means for increasing a trustworthiness value associated with the single base station if the first position estimate for the mobile device and the location of the single base station are corroborated.

18. The apparatus of claim 17, comprising means for determining a second position estimate for the mobile device based on the plurality of first network station information received from the plurality of base stations and the second network station information received from the single base station.

19. An apparatus for transferring trust between networks, comprising:
means for receiving a plurality of first network station information from a plurality of base stations;
means for determining a first position estimate for a mobile device based on the plurality of first network station information;
means for receiving a second network station information from a single base station, wherein the single base station is not one of the plurality of base stations;
means for determining a location of the single base station;
means for determining if the first position estimate for the mobile device and the location of the single base station are corroborated; and means for decreasing a trustworthiness value associated with the single base station if the first position estimate for the mobile device and the location of the single base station are uncorroborated.

20. An apparatus for transfer trust between networks, comprising:
    a memory;
    a processor configured to:
        receive a plurality of first network station information from a plurality of base stations;
        determine a first position estimate for a mobile device based on the plurality of first network station information;
        receive a second network station information from a single base station, wherein the single base station is not one of the plurality of base stations;
        determine a location of the single base station;
        determine if the first position estimate for the mobile device and the location of the single base station are corroborated; and
        increase a trustworthiness value associated with the single base station if the first position estimate for the mobile device and the location of the single base station are corroborated, wherein the trustworthiness value is stored in the memory.

21. The apparatus of claim 20, wherein the processor is configured to determine a second position estimate for the mobile device based on the plurality of first network station information received from the plurality of base stations and the second network station information received from the single base station.

22. An apparatus for transfer trust between networks, comprising:
    a memory;
    a processor configured to:
        receive a plurality of first network station information from a plurality of base stations;
        determine a first position estimate for a mobile device based on the plurality of first network station information;
        receive a second network station information from a single base station, wherein the single base station is not one of the plurality of base stations;
        determine a location of the single base station;
        determine if the first position estimate for the mobile device and the location of the single base station are corroborated; and
        decrease a trustworthiness value associated with the single base station if the first position estimate for the mobile device and the location of the single base station are uncorroborated.

23. A computer program product residing on a processor-executable storage medium, the computer program product comprising processor-executable instructions configured to cause a processor to:
    receive a plurality of first network station information from a plurality of base stations;
    determine a first position estimate for a mobile device based on the plurality of first network station information;
    receive a second network station information from a single base station, wherein the single base station is not one of the plurality of base stations;
    determine a location of the single base station;
    determine if the first position estimate for the mobile device and the location of the single base station are corroborated; and
    increase a trustworthiness value associated with the single base station if the first position estimate for the mobile device and the location of the single base station are corroborated.

24. The computer program product of claim 23, comprising instructions configured to cause the processor to determine a second position estimate for the mobile device based on the plurality of first network station information received from the plurality of base stations and the second network station information received from the single base station.

25. A computer program product residing on a processor-executable storage medium, the computer program product comprising processor-executable instructions configured to cause a processor to:
    receive a plurality of first network station information from a plurality of base stations;
    determine a first position estimate for a mobile device based on the plurality of first network station information;
    receive a second network station information from a single base station, wherein the single base station is not one of the plurality of base stations;
    determine a location of the single base station;
    determine if the first position estimate for the mobile device and the location of the single base station are corroborated; and
    decrease a trustworthiness value associated with the single base station if the first position estimate for the mobile device and the location of the single base station are uncorroborated.

* * * * *